US012602589B2

(12) United States Patent (10) Patent No.: US 12,602,589 B2
Burkhart et al. (45) Date of Patent: Apr. 14, 2026

(54) CAUSAL INFERENCE VIA NEUROEVOLUTIONARY SELECTION

(71) Applicant: ADOBE INC., San Jose, CA (US)

(72) Inventors: Michael Craig Burkhart, Plainfield, IN (US); Gabriel Ruiz, Jurupa Valley, CA (US)

(73) Assignee: Adobe Inc., San Jose, CA (US)

( * ) Notice: Subject to any disclaimer, the term of this patent is extended or adjusted under 35 U.S.C. 154(b) by 1001 days.

(21) Appl. No.: 17/748,891

(22) Filed: May 19, 2022

(65) Prior Publication Data

US 2023/0376776 A1 Nov. 23, 2023

(51) Int. Cl.
*G06N 3/086* (2023.01)

(52) U.S. Cl.
CPC ..................................... *G06N 3/086* (2013.01)

(58) Field of Classification Search
CPC ........................................................ G06N 3/00
USPC ............................................................ 706/13
See application file for complete search history.

(56) References Cited

U.S. PATENT DOCUMENTS

| | | | | |
|---|---|---|---|---|
| 10,916,333 | B1 * | 2/2021 | Yeturu ..................... | G06N 7/01 |
| 12,254,030 | B1 * | 3/2025 | Guggenmos ........... | G06N 20/00 |
| 2009/0281981 | A1 * | 11/2009 | Chen ................. | G06F 18/24323 |
| | | | | 706/56 |
| 2021/0043086 | A1 * | 2/2021 | Chen ........................ | G06N 5/01 |
| 2021/0073626 | A1 * | 3/2021 | Brahma ................. | G05D 1/247 |
| 2023/0267216 | A1 * | 8/2023 | Santana De Oliveira ................... | |
| | | | | G06F 21/6245 |
| | | | | 726/26 |

OTHER PUBLICATIONS

Kar et al., "Meta-sim: learning to generate synthetic datasets", ICCV2019, 2019 (Year: 2019).*
Baluja, et al., "Adversarial transformation networks: learning to generate adversarial examples", arXiv: 1703.0938yv1 [cs.NE] Mar. 28, 2017 (Year: 2017).*
Athey, S., et al., "Generalized Random Forests", The Annals of Statistics, Institute of Mathematical Statistics, vol. 47, No. 2, 1148-1178 (2019).
Bengio, Y., et al., "Representation Learning: A Review and New Perspectives", IEEE Transactions on Pattern Analysis and Machine Intelligence, vol. 35, Issue 8, pp. 1-31 (2013).

(Continued)

*Primary Examiner* — Tsu-Chang Lee

(74) *Attorney, Agent, or Firm* — Shook, Hardy & Bacon L.L.P.

(57) ABSTRACT

The technology is directed towards receiving training data regarding a set of observations. Each observation includes a feature set, a treatment, and an outcome. A first generation of machine learning models is trained, via the training data, to predict an outcome for a feature set of a given observation. A new generation of models is generated by selecting a subset of models from the trained first generation of models based on a fitness criteria of each model to generate an intermediate layer for use in predicting a treatment. An algorithm is applied to the selected subset of models to generate the new generation of models. Transformed training data is generated using the training data and a model of the new generation of models. The transformed training data includes, for each observation, a transformed feature set comprising a representation of the feature set in a latent space of the model.

20 Claims, 8 Drawing Sheets

(56)                    References Cited

OTHER PUBLICATIONS

Duchi, J., et al., "Adaptive Subgradient Methods for Online Learning and Stochastic Optimization", Journal of Machine Learning Research, vol. 12, pp. 2121-2159 (Jul. 2011).

Fogel, L. J., "Autonomous Automata", Industrial Research Magazine, vol. 4, Issue 2, pp. 14-19 (1962).

Forsyth, R., "Beagle—A Darwinian Approach to Pattern Recognition", Kybernetes, vol. 10, Issue 3, pp. 159-166 (1981).

Glorot, X., and Bengio, Y., "Understanding the difficulty of training deep feedforward neural networks", Proceedings of the 13th International Conference on Artificial Intelligence and Statistics (AISTATS), Journal of Machine Learning Research, vol. 9, pp. 249-256 (2010).

Hornik, K., et al., "Multilayer Feedforward Networks are Universal Approximators", Neural Networks, vol. 2, Issue 5, pp. 359-366 (1989).

Johansson, F. D., et al., "Learning Representations for Counterfactual Inference", Proceedings of the 33rd International Conference on Machine Learning, arXiv:1605.03661, vol. 48, pp. 1-11 (Jun. 8, 2016).

Ke, G., et al., "LightGBM: A Highly Efficient Gradient Boosting Decision Tree", 31st Conference on Neural Information Processing Systems (NIPS), pp. 1-9 (2017).

Kingma, D. P., and Ba, L. J., "Adam: a Method for Stochastic Optimization", Proceedings of 3rd International Conference for Learning Representations, arXiv:1412.6980v8, pp. 1-15 (Jul. 23, 2015).

Kunzel, S. R., et al., "Metalearners for estimating heterogeneous treatment effects using machine learning", Proceedings of the National Academy of Sciences, vol. 116, No. 10, pp. 4156-4165 (Mar. 5, 2019).

Li, S., and Fu, Y., "Matching on Balanced Nonlinear Representations for Treatment Effects Estimation", 31st Conference on Neural Information Processing Systems (NIPS), pp. 1-11 (2017).

Montana, D. J., and Davis, L., "Training Feedforward Neural Networks Using Genetic Algorithms", Proceedings of the 11th International Joint Conference on Artificial Intelligence, vol. 1, pp. 762-767 (1989).

Moscato, P., "On Evolution, Search, Optimization, Genetic Algorithms and Martial Arts : Towards Memetic Algorithms", Caltech Concurrent Computation Program, California Institute of Technology, pp. 1-68 (1989).

Neyman, J., "Sur les applications de la theorie des probabilit'es aux experiences agricoles: Essay des principes", Rocz. Nauk Rol., vol. 10, 1-52 (1923).

Nie, X., and Wager, S., "Quasi-oracle estimation of heterogeneous treatment effects", Biometrika, vol. 108, Issue 2, pp. 299-319 (2021).

Robins, J. M., "Optimal Structural Nested Models for Optimal Sequential Decisions", Proceedings of the Second Seattle Symposium in Biostatistics, Part of the Lecture Notes in Statistics book series (LNS), vol. 179, pp. 1-138 (2004).

Robinson, P. M., "Root-N-Consistent Semiparametric Regression", Econometrica, Journal of the Econometric Society, vol. 56, No. 4, pp. 931-954 (Jul. 1988).

Rosenbaum, P. R., and Rubin, D. B., "The central role of the propensity score in observational studies for causal effects", Biometrika, vol. 70, Issue 1, pp. 41-55 (1983).

Rubin, D. B., "Estimating Causal Effects of Treatments in Randomized and Nonrandomized Studies", Journal of Educational Psychology, vol. 66, No. 5, pp. 688-701 (1974).

Shalit, U., et al., "Estimating individual treatment effect: generalization bounds and algorithms", Proceedings of the 34th International Conference on Machine Learning, vol. 70, pp. 1-10 (2017).

Shanechi, M. M., et al., "Rapid control and feedback rates enhance neuroprosthetic control", Nature Communications, Article No. 813825, pp. 1-10 (2017).

Srivastava, N., "Dropout: A Simple Way to Prevent Neural Networks from Overfitting", Journal of Machine Learning Research, vol. 15, pp. 1929-1958 (2014).

Stanley, K. O., et al., "Designing neural networks through neuroevolution", Nature Machine Intelligence, vol. 1, pp. 24-35 (Jan. 2019).

Tihonov, A. N., "Solution of Incorrectly Formulated Problems and the Regularization Method", Soviet Mathematics, vol. 4, Issue 4, pp. 1035-1038 (1963).

Wager, S., and Athey, S., "Estimation and Inference of Heterogeneous Treatment Effects using Random Forests", Journal of the American Statistical Association, vol. 113, No. 523, pp. 1-16 (2018).

Yao, L., et al., "Representation Learning for Treatment Effect Estimation from Observational Data", 32nd Conference on Neural Information Processing Systems (NeurIPS), vol. 31, pp. 1-11 (2018).

Zeiler, M. D., "Adadelta: an Adaptive Learning Rate Method", arXiv:1212.5701v1, pp. 1-6 (Dec. 22, 2012).

Zhang, Y., et al., "Learning Overlapping Representations for the Estimation of Individualized Treatment Effects", Proceedings of the 23rdInternational Conference on Artificial Intelligence and Statistics (AISTATS), arXiv:04754v3, vol. 108, pp. 1-9 (2020).

Zhao, H., et al., "On Learning Invariant Representations for Domain Adaptation", Proceedings of the 36th International Conference on Machine Learning, arXiv:1901.09453v2, pp. 1-21 (May 30, 2019).

* cited by examiner

Genetic Algorithm
300

Initial Generation 310

Second Generation 320

Temporal Axis 360

Final Generation 330

Spontaneously Generated Transformations 340

Best Performing Transformation from Previous Generation 350

Figure 4:
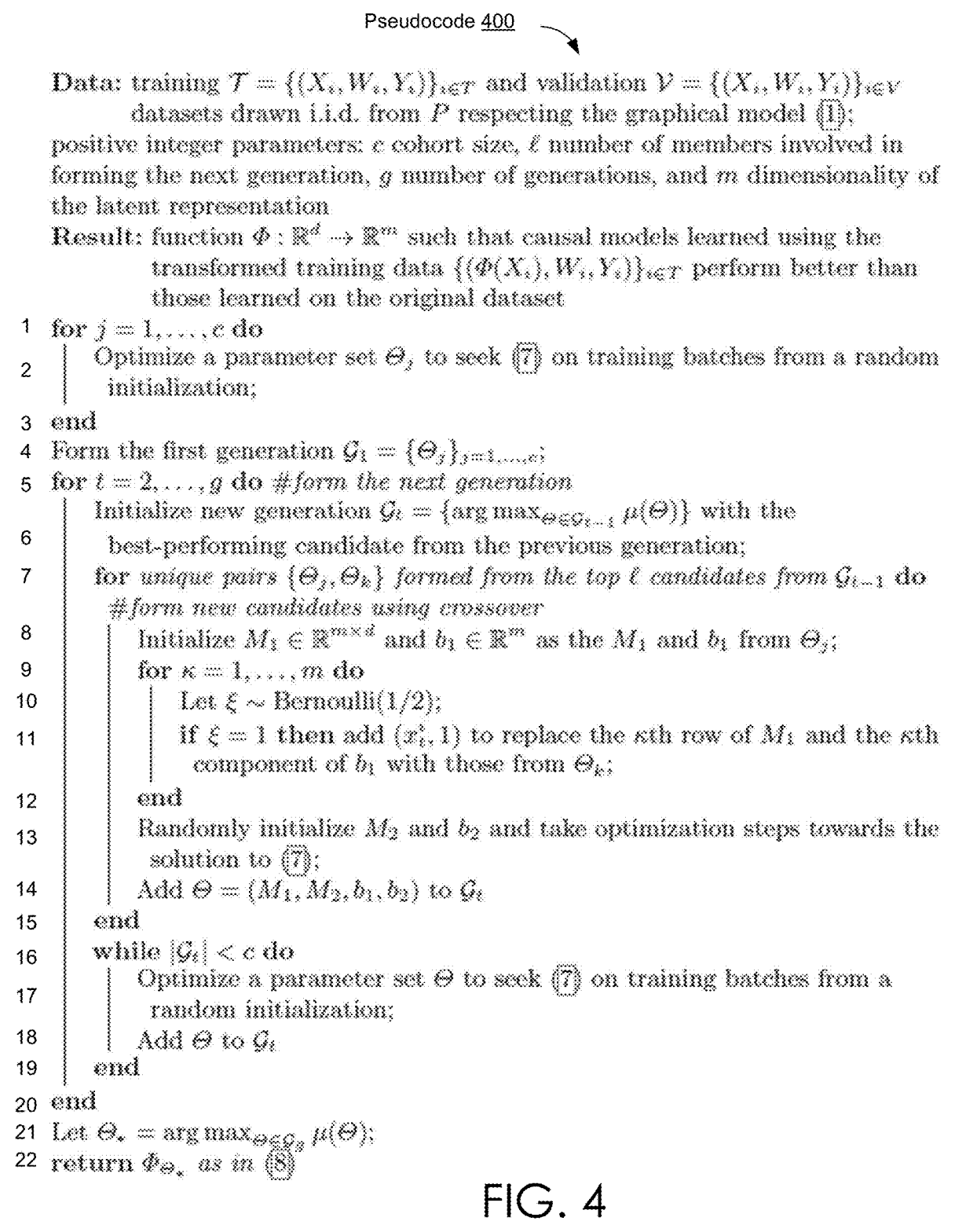

Pseudocode 400

Data: training $\mathcal{T} = \{(X_i, W_i, Y_i)\}_{i \in T}$ and validation $\mathcal{V} = \{(X_i, W_i, Y_i)\}_{i \in V}$ datasets drawn i.i.d. from $P$ respecting the graphical model ①; positive integer parameters: $c$ cohort size, $\ell$ number of members involved in forming the next generation, $g$ number of generations, and $m$ dimensionality of the latent representation

Result: function $\Phi : \mathbb{R}^d \rightarrow \mathbb{R}^m$ such that causal models learned using the transformed training data $\{(\Phi(X_i), W_i, Y_i)\}_{i \in T}$ perform better than those learned on the original dataset 1   for $j = 1, \ldots, c$ do
2   |   Optimize a parameter set $\Theta_j$ to seek ⑦ on training batches from a random initialization;
3   end
4   Form the first generation $\mathcal{G}_1 = \{\Theta_j\}_{j=1,\ldots,c}$;
5   for $t = 2, \ldots, g$ do #form the next generation
6   |   Initialize new generation $\mathcal{G}_t = \{\arg\max_{\Theta \in \mathcal{G}_{t-1}} \mu(\Theta)\}$ with the best-performing candidate from the previous generation;
7   |   for unique pairs $\{\Theta_j, \Theta_k\}$ formed from the top $\ell$ candidates from $\mathcal{G}_{t-1}$ do #form new candidates using crossover
8   |   |   Initialize $M_1 \in \mathbb{R}^{m \times d}$ and $b_1 \in \mathbb{R}^m$ as the $M_1$ and $b_1$ from $\Theta_j$;
9   |   |   for $\kappa = 1, \ldots, m$ do
10  |   |   |   Let $\xi \sim \text{Bernoulli}(1/2)$;
11  |   |   |   if $\xi = 1$ then add $(x_i^\kappa, 1)$ to replace the $\kappa$th row of $M_1$ and the $\kappa$th component of $b_1$ with those from $\Theta_k$;
12  |   |   end
13  |   |   Randomly initialize $M_2$ and $b_2$ and take optimization steps towards the solution to ⑦;
14  |   |   Add $\Theta = (M_1, M_2, b_1, b_2)$ to $\mathcal{G}_t$
15  |   end
16  |   while $|\mathcal{G}_t| < c$ do
17  |   |   Optimize a parameter set $\Theta$ to seek ⑦ on training batches from a random initialization;
18  |   |   Add $\Theta$ to $\mathcal{G}_t$
19  |   end
20  end
21  Let $\Theta_* = \arg\max_{\Theta \in \mathcal{G}_g} \mu(\Theta)$;
22  return $\Phi_{\Theta_*}$ as in ⑧

RECEIVE OBSERVATIONAL DATA                                      502

GENERATE INITIAL GENERATION OF
MODELS USING OBSERVATIONAL DATA                                 504

GENERATE ITERATIVE GENERATIONS
OF MODELS BY APPLYING GENERATIC
ALGORITHM                                                      506

SELECT EVOLVED MODEL FROM
GENERATION USING SELECTON
CRITERIA                                                       508

DETERMINE HETEROGENEOUS EFFECT
USING SELECTED EVOLVED MODEL                                    510

600

RECEIVE FIRST VECTOR
REPRESENTATION OF SUBJECT — 602

GENERATE SECOND VECTOR
REPRESENTATION OF SUBJECT — 604

DETERMINE HETEROGENEOUS EFFECT
FOR SUBJECT USING SECOND VECTOR
REPRESENTATION — 606

DETERMINE WHETHER TO PERFORM
TREATMENT ON SUBJECT BASED ON
HETEROGENEOUS EFFECT — 608

CAUSAL INFERENCE VIA NEUROEVOLUTIONARY SELECTION

BACKGROUND

Estimating the causal effect of treatments on a desired outcome is one of the main components of prescriptive analysis in the sciences and social sciences. Causal effect estimation has applications across multiple domains as it can greatly assist in decision making processes. For instance, application in the medical domain includes estimating the effect of a treatment, such as taking preventive-vaccines, immunity-boosters, or food-supplements, on a desired clinical outcome, such as the prevention of a disease. With massive growth in online technologies, some causal effect analyses have become part of the decision making process in the domain of online businesses. For example, the effect of a new page layout on a click through rate could be taken into account when designing a web page, or the effect of a new ranking algorithm on engagement could be estimated when deciding whether to implement the ranking algorithm.

SUMMARY

The technology described herein is directed towards enhanced methods and systems for estimating heterogeneous causal effects. In at least one embodiment, data (e.g., training data) is received and/or accessed. The data can encode information pertaining to a set of observations (e.g., experimental observations). Each observation can be associated with a subject and/or object (e.g., a user, a computing device, an application, or the like) and whether or not a treatment (or intervention) was provided to the subject/object. The data pertaining to a particular observation can include a feature set that encodes multiple features associated with the object/subject, a treatment, and an outcome for the subject/object. More particularly, the data can represent a vector or 1-tensor (e.g., $X \in \mathbb{R}^d$) for each observation that encodes the feature set for the observation. The vector can be a feature embedding in a first vector space (e.g., a first latent vector space). The data can also represent a binary state (e.g., $W=0$ or 1) for each observation that encodes whether or not the observation's object/subject received the treatment, as well as a real (or rational) value (e.g., $Y \in \mathbb{R}$) encoding an outcome associated with the subject/object.

The data can be employed to train a first generation (e.g., an initial or an intermediate generation) of models (e.g., machine learning (ML)) models. Such ML models can include but are not limited to models implementable by one or more neural network-based architectures. The training objective of the training can include learning an injective mapping (e.g., a transformation $\Phi(X)$) from the first vector space (e.g., the vector space that is associated with the feature sets) to a second vector space (e.g., a second latent space). The training objective can bias the learning such that the mapping conserves some information (e.g., information associated with a feature set embedded) in the first vector space, wherein the conserved information is predictive of the outcome associated with the feature set. Thus, each model of a generation of models can implement a transformation of a feature set embedding from the first vector space to the second vector space. A given model's transformation can be implemented in an intermediate layer of a neural network-based architecture that at least partially instantiates the model. As such, the transformation can at least be partially encoded in a 2-tensor (e.g., a matrix). The training objective biases the transformation such that the transformed vector representing a feature set for a subject/object is predictive of the outcome associated with the subject/object.

A new (or subsequent) generation of models can be generated via a genetic algorithm. The genetic algorithm can generate multiple generations of models to produce long lineages of the initial generation of models. The models for each generation in a lineage (except for the initial generation) are generated by mixing, blending, and/or (e.g., deterministically and/or stochastically) mutating characteristics of pairs of models from a previous generation. That is, pairs of models (e.g., pairs of parent models) are "genetically" combined to reproduce as one or more child models. The child models of a previous generation comprise the models of the subsequent generation of models. A subset of a generation's child models are selected (via a fitness criteria) as suitable parents to produce the next generation of models. That is, the genetic algorithm (implementing the fitness criteria) can select a subset of models at each generation. The fitness criteria of the genetic algorithm can be at least partially aligned with the training objective used for training the models. Thus, the fitness criteria can be biased towards selecting potential parent models that are at least partially effective in conserving the information from the first vector space that is predictive of the outcome, based on the feature set of the associated subject/object. As indicated above, the conserving of such information can be implemented in an intermediate layer of a neural network-based model and/or a linear transformation 2-tensor.

After at least partially generating a lineage of models via evolutionary mechanisms (e.g., as implemented by the genetic algorithm), the fitness criteria can be employed to select one or more sufficiently-fit models of the lineage. A sufficiently-fit model can be employed to generate transformed data (e.g., transformed training data) based on the received data. The transformed data can include a transformed feature set, as well as the corresponding treatment and outcome for each observation. As noted above, the transformed feature sets can be encoded in a vector embedding (e.g., a representation) in the second vector space.

BRIEF DESCRIPTION OF THE DRAWINGS

FIG. 4 illustrates pseudo-code for a process for evolving a transformation that enables an estimation of a heterogeneous causal effect, in accordance with various embodiments.

DETAILED DESCRIPTION OF THE EMBODIMENTS

Figure 1:
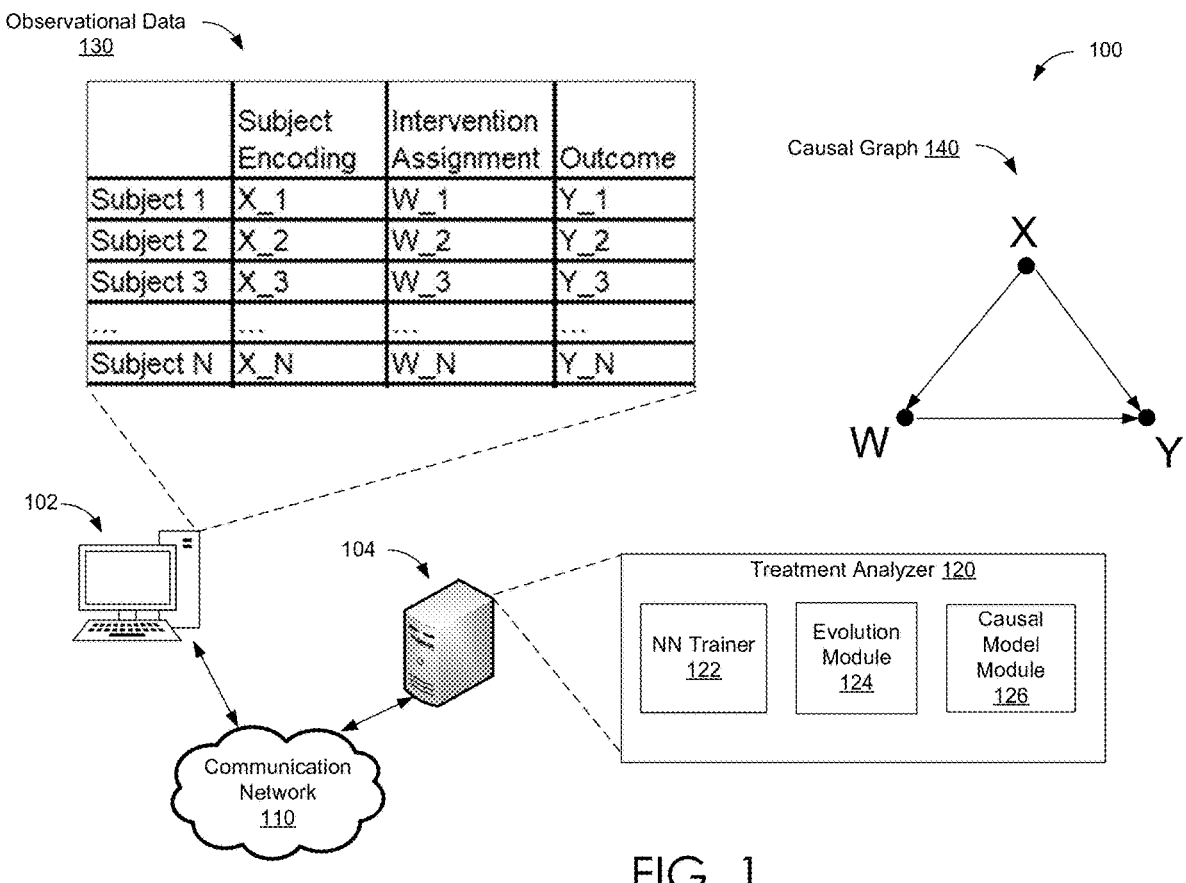
FIG. 1 illustrates an enhanced treatment analysis system implementing various embodiments presented herein.

The technology described herein generally relates to causal estimation using neuroevolutionary selection to generate causal models that provide improved estimation over conventional approaches. At a high level, neuroevolutionary selection is employed to evolve features for training causal models with improved performance.

Causal estimation involves estimating an effect of a treatment on an outcome for a given subject. Causal models, such as meta-learners, causal forests, and the like, are often used for estimating causal effect. Given observational data, a causal model can be trained to estimate causal effect, such as a conditional average treatment effect (CATE).

The observational data often used to train causal models is based on a number of observations, with each observation including: (1) a feature set with information regarding features of a subject (e.g., a patient, a user, a web page, a data transaction, etc.); (2) a treatment given to the subject; and (3) an observed outcome. For instance, in the medical domain, an observation could include features of a patient (e.g., age, gender, weight, etc.), whether the patient was given a vaccine (i.e., the treatment), and whether the patient contracted a disease (i.e., the observed outcome). Once trained on observational data, a causal model can be used to predict an expected individualized outcome of assigning a treatment to a novel subject. For instance, given a new patient with certain features, a causal model can be used to predict whether the patient will contract a disease if given a vaccine.

There are a number of shortcomings of conventional causal modeling that impact the accuracy of estimating causal effect. One inherent limitation is the unavailability of counterfactual observational data. That is, while an observation provides an observed outcome for the treatment given to a subject, no observational data is available for what outcome would have occurred if the treatment were not given to that subject. For instance, while it is known that a patient did not contract a disease after receiving a vaccine, it is unknown what the outcome would have been if the patient was not given the vaccine.

Another shortcoming of existing approaches relates to the ability to model causal relationships between features and outcomes as opposed to correlational relationships. This can be impacted, for instance, by lack of proper experimental controls when collecting observational data. For example, during clinical trials for a treatment under investigation, the treatment and control groups can have been inadvertently selected from (at least slightly) different populations. Such inadequate controls can significantly bias the causal effect estimate. As a result, the estimation of the causal effect can be more correlational and less causal in nature. This reflects that features of subjects in observational data contain information for predicting both outcome and treatment, but for the purposes of estimating causal effect, information in features for predicting the treatment is effectively noise.

The technology described herein solves these problems by providing an approach for estimating causal effect that more accurately models causal relationships between features and outcomes. Instead of training a causal model using original feature sets in observational data, aspects of the technology described herein train a causal model using transformed representations of those features (referred to herein as transformed feature sets), in which the transformed representations are encodings that retain information predictive of outcome while minimizing information predictive of treatment.

In accordance with some aspects of the technology described herein, a neuroevolutionary approach is used to learn transformed feature sets from observational data such that the transformed feature sets satisfy two fitness objectives: (1) the transformed feature sets are as useful at predicting outcome as the original feature sets; and (2) the transformed feature sets are less useful at predicting treatment relative to other candidate transformed features sets. The neuroevolutionary approach includes generating successive generations of machine learning (ML) models to evolve a transformation for generating transformed features sets from the observational data that satisfy the two fitness objectives.

At each generation, a cohort of ML models is trained using the observational data to predict an outcome given a feature set. Each ML model includes a transformation for mapping a feature set in a first vector space to a transformed feature set in a second vector space at an intermediate layer of the ML model. Because each ML model is trained to predict outcome given a feature set, the transformed feature set at the intermediate layer of the ML model is as useful at predicting outcome as the original feature set, thereby satisfying the first fitness objective indicated above.

Each ML model in a generation is evaluated with a fitness criteria that assesses the model's ability to provide a transformed feature set that is less predictive of treatment. In accordance with some aspects, each ML model is paired with a second ML model for assessing the usefulness of the transformed feature set at predicting treatment. A subset of the ML models from a generation are selected based on the fitness criteria and used to generate the ML models for the subsequent generation by forming a cross between pairs of selected ML models.

After a transformation has been evolved and selected for, the transformation can be used to transform the feature sets of the observational data to the second vector space to provide transformed feature sets. A causal model (e.g., meta-learner, causal forest, etc.) can be trained via transformed observational data that includes for each observation: the transformed feature set, the observed treatment, and the observed outcome. The causal model can be used to determine a heterogeneous causal effect (associated with the treatment) for a novel subject (e.g., a subject that was not in the set of subjects for the observational data). A decision whether to give the treatment to the novel subject can be based on the estimated heterogeneous effect for the novel subject.

The technology described herein provides a number of advantages over conventional approaches for estimating causal effect. The embodiments discussed herein provide increased performance for estimating such causal effects, which do not suffer from the biases associated with population-level differences between the treatment and control groups that can be included in the observational data. In particular, because at least a portion of the information associated with a prediction of the treatment assignment is removed in the transformation from the first vector space to the second vector space, the estimate of the causal effect for the novel subject is not biased based on population-level differences between treatment and control groups as in conventional methods. Thus, the estimation of the heterogeneous effect provided by embodiments described herein is more accurate than that associated with conventional methods. While some conventional approaches apply a transformation to the subjects' features in the observational data, the information that is conserved in such conventional methods is different. More specifically, such conventional methods employ a transformation that results in embedded features that are invariant to treatment prediction. Consequently, these conventional methods conserve some of the information that is useful for predicting the outcome, but tend to discard all (or most) of the information (from the first vector space) that is relevant for predicting treatment assignment (as opposed to conserving the information that is helpful in predicting both the outcome and the treatment). The evolved transformation of the technology described herein, in contrast, conserves the information that is helpful in predicting both the outcome and the treatment while minimizing information that is predictive of treatment alone. As a result, the heterogeneous effect estimated provided by embodiments described herein is more accurate than that associated with such conventional methods. Accordingly, the embodiments enable a better decision process as to whether to administer a treatment on a particular subject than conventional methods.

Example Operating Environment for Estimating Causal Effect

FIG. 1 illustrates an enhanced treatment analysis system 100 implementing various embodiments presented herein. Treatment analysis system 100 is enabled to employ a causal graph 140 and corresponding observational data 130 to determine an effect of a treatment on an outcome, such as but not limited to the conditional average treatment effect (CATE). Treatment analysis system 100 can include at least a client computing device 102 and a server computing device 104, in communication via a communication network 110. The client computing device 102 can provide observational data 130 to the server computing device 104, via the communication network 110. The server computing device 104 implements a treatment analyzer 120. The treatment analyzer 120 is enabled to determine a causal effect (e.g., an estimation of the CATE) for a treatment on an outcome, based on the observational data 130 and the causal graph 140. Although a client/server architecture is shown in FIG. 1, the embodiments are not limited to such architectures. For example, client computing device 102 can implement the treatment analyzer 120, obviating the offloading of tasks to server devices.

Communication network 110 can be a general or specific communication network that is directly and/or indirectly communicatively coupled to client computing device 102 and server computing device 104. Communication network 110 can be any communication network, including virtually any wired and/or wireless communication technologies, wired and/or wireless communication protocols, and the like. Communication network 110 can be virtually any communication network that communicatively couples a plurality of computing devices and storage devices in such a way as to allow computing devices to exchange information via communication network 110.

In some aspects, observational data 130 is conceptualized (or structured) as a 2D data array (e.g., arranged in a table). Each row in the table corresponds to an observation for a subject (e.g., a user, a patient, data transaction, or the like). The data for the observation corresponding to the $i^{th}$ subject is conceptualized (or structured) as a 3-tuple: $(X_i, W_i, Y_i)$, where $X \in \mathbb{R}^d$ is a first data object that denotes a feature set (e.g., a feature vector or subject encoding) for the $i^{th}$ subject. $W \in \{0,1\}$ is a second data object that denotes a boolean treatment (i.e., intervention) assignment for the $i^{th}$ subject. $Y \in \mathbb{R}$ is a third data object that denotes a scalar outcome for the $i^{th}$ subject. As an illustrative example, the observational data for the $i^{th}$ subject could include: a feature set X encoding information regarding a patient, such as age, gender, weight, etc.; a treatment assignment W indicating whether the patient received a vaccine; and an outcome Y indicating whether the patient contracted a disease. The 3-tuples (e.g., $(X_i, W_i, Y_i)$ for i=1, . . . , N (where N is a positive integer that denotes the number of observational subjects) can be considered as independent and identically distributed (i.i.d.) samples that are sampled from a distribution P. The observational data is assumed to be subject to the following causal graph:

$$(1)$$

$$
\begin{array}{ccc}
 & X & \\
\swarrow & & \searrow \\
W & \longrightarrow & Y
\end{array}
$$

The causal relationships between the variables (X, W, Y) are modeled via the causal graph 140. For the scalar outcomes, the following notation is adopted: $Y_i(0)$ denotes the potential outcome if the treatment $W_i$ were set to 0, and $Y_i(1)$ denotes the potential outcome if the treatment $W_i$ were set to 1. In some aspects, the conditional average treatment effect (CATE) is calculated as:

$$\tau(x) = \mathbb{E}[Y(1)-Y(0)|X=x]. \quad (2)$$

It can be assumed that the treatment assignment is an unconfounded variable, e.g.:

$$\{Y_i(0), Y_i(1)\} \perp W_i | X_i,$$

for all $i$, and random in the sense that $$\epsilon < P(W_i=1|X_i=x_i) < 1-\epsilon$$

for all i, for a particular $\epsilon > 0$, and for all $x_i \in \mathbb{R}^d$ in the support of $X_i$. These assumptions are jointly known as strong ignorability and provide sufficiency for an estimate of the CATE from the observational data 130. That is, under these assumptions, causal models (e.g., meta-learners, causal forest, etc.) can be employed to generate and estimate the CATE based on observational data 130. The causal models enable a calculation of the CATE for a subject not included in the observational data 130 (e.g., a new and/or novel subject), predicting an expected individualized outcome of assigning a treatment to the novel subject.

Using the observational data 130 as an input, treatment analyzer 120 generates a learned transformation (i.e., function) $\Phi: \mathbb{R}^d \rightarrow \mathbb{R}^m$. When applied to the original observational data 130 $(X_i, W_i, Y_i)$, the transformation generates transformed observational data (e.g., $\Phi(X_i), W_i, Y_i$) such that the estimated causal effect from a causal model trained from the transformed observational data is more accurate than the estimated causal effect from a causal model trained on the original observational data 130. In particular, treatment analyzer 120 learns (via a genetic algorithm and the observational data 130) a transformation $\Phi$ that, when applied to the feature set X for each observation, generates a transformed feature set $\Phi(X)$ for each observation such that the following two fitness objectives are satisfied:

1. The transformed feature set $\Phi(X)$ is as useful as the original feature set X for estimating (or predicting) outcome Y, and 2. among a set of representations that satisfies (1), the transformed feature set $\Phi(X)$ is less useful for estimating (or predicting) treatment W.

Going forward, the fitness objective indicating that the transformed feature set $\Phi(X)$ is as useful as the original feature set X for predicting Y can be referred to as fitness objective (1). Similarly, the fitness objective indicating that the transformed feature set $\Phi(X)$ is non-predictive (less predictive) of treatment W can be referred to as fitness objective (2). To such ends, treatment analyzer 120 evolves a transformation $\Phi$ that generates a transformed feature set $\Phi(X)$ that conserves (at least some) information encoded in the original feature set X that is predictive of the outcome Y, but is non-conservative of (at least some of) other information encoded in X that is predictive of the treatment assignment W. The transformation $\Phi$ is learned from the input observational data 130 and a genetic algorithm. More specifically, the transformation $\Phi$ can be implemented by a learned intermediate layer in a neural network that estimates a functional relationship of outcome Y given a feature set X. Even more specifically, a genetic algorithm can be employed to evolve transformations that increase the utility of the transformed feature set $\Phi(X)$ in predicting outcome Y, while decreasing the utility of the transformed feature set $\Phi(X)$ in predicting treatment W. That is, once sufficiently evolved, the transformation $\Phi$ simultaneously satisfies fitness objectives (1) and (2).

As shown in FIG. 1, treatment analyzer 120 includes a neural network (NN) trainer 122, an evolution module 124, and a causal model module 126. The transformation $\Phi$ can be implemented in NN. NN trainer 122 is generally responsible for employing random generators and one or more supervised learning methods to seed and train candidate NNs for the transformation $\Phi$. Evolution module 124 is generally responsible for employing a genetic algorithm on trained sets of candidate NNs (e.g., that implement candidate $\Phi$) to evolve and select a transformation $\Phi$ to generate transformed feature sets from the original feature sets in the observational data 130. The causal model module 126 trains one or more causal models (e.g., meta-learners, causal forest, etc.) with the transformed feature sets $\Phi(X)$, and employs the causal model(s) to estimate the causal effect of a treatment on an outcome for a subject not included in the observational data 130 (e.g., a novel subject).

The one or more causal models employed by the causal model module 126 can include, but are not otherwise limited to S-learner methods, T-learner methods, X-learner methods, and R-learner methods. Each of these meta-learners can be employed to estimate the causal effect of a treatment for a novel subject.

As noted above, the standard assumptions of unconfoundedness and the random treatment assignment can be assumed. That is, strong ignorability can be assumed for the observational data 130. Given i.i.d. samples from a distribution P (e.g., observational data 130) respecting causal graph 140, and the assumption of strong ignorability, any of the meta-learner methods or other methods implemented by causal model module 126 can leverage an arbitrary regression framework to estimate the CATE for a subject.

In some aspects, an S-learner (e.g., a single-learner) method employs a standard supervised learner to estimate $\mu(x, w) = \mathbb{E}[Y|X=x, W=w]$ from observation data and then estimates the CATE as follows:

$$\hat{\tau}_S(x) = \hat{\mu}(x, 1) - \hat{\mu}(x, 0)$$

where the standard hat notation is used to denote estimated versions of underlying functions.

A T-learner (e.g., a two-learner) method estimates $\mu_1(x) = \mathbb{E}[Y(1)|X=x]$ from observed challenger data $\{(X_i, Y_i)\}_{w_i=1}$ and $\mu_0(x) = \mathbb{E}[Y(0)X=x]$ from observation data $\{(X_i, Y_i)\}_{w_i}=0$. The T-learner then estimates the CATE as follows:

$$\hat{\tau}_T(x) = \hat{\mu}_1(x) - \hat{\mu}_0(x).$$

An X-learner method estimates $\mu_1$ and $\mu_0$ as in a T-learner method. The X-learner predicts the contrapositive outcome for each training point. The X-learner estimates $$\tau_1(x) = \mathbb{E}\left[\tilde{D}_i^1 \mid X = x\right]$$

on $$\left\{\left(X_i, \tilde{D}_i^1\right)\right\}_{W_i=1},$$

where $$\tilde{D}_i^1 = Y_i - \hat{\mu}_0(X_i)$$

and $$\tau_0(x) = \mathbb{E}\left[\tilde{D}_i^0 \mid X = x\right]$$

on $$\left\{\left(X_i, \tilde{D}_i^0\right)\right\}_{W_i=0}$$

where $$\tilde{D}_i^0 = \hat{\mu}_1(X_i) - Y_i.$$

The X-learner estimates the CATE as follows:

$$\hat{\tau}_X(x) = g(x)\hat{\tau}_0(x) + (1 - g(x))\hat{\tau}_1(x)$$

where $g: \mathbb{R}^d \rightarrow [0,1]$ is a weight function. A treatment propensity function (e.g., see equation (3) in conjunction with the discussion pertaining to an R-learner) can work well for g, as do the constant functions 1 and 0. In at least one embodiment, $g(x) \equiv \frac{1}{2}$ is employed.

In at least some X-learner methods, $\tau$ is directly estimated via:

9

$\{(X_i, Y_i - \mu_0(X_i))\}_{w_i=1} \cup \{(X_i, \hat{\mu}_1(X_i) - Y_i)\}_{w_i=0}.$ In some X-learner methods, $\tau$ is estimated using $\hat{\mu}(x, w)$ from an S-learner method as follows:

$\{(X_i, Y_i - \hat{\mu}(X_i, 0))\}_{w_i=1} \cup \{(X_i, \mu(X_i, 1) - Y_i)\}_{w_i=0}.$ Such X-learner methods can obviate estimating or fixing g.

Some R-learner methods employ a graphical model. In such methods, a treatment propensity (sometimes referred to as a propensity score) can be defined as follows:

$$e(x) = P(W = 1 | X = x), \qquad (3)$$

and a conditional mean outcome is computed as:

$$m(x) = \mathbb{E}[Y | X = x]. \qquad (4)$$

R-learner methods leverage Robinson's decomposition which leads to a reformulation of the CATE function as the solution to the optimization problem:

$$\tau(\cdot) = \operatorname*{argmin}_{\tau}\{\mathbb{E}_{(X,W,Y) \sim P}[|(Y - m(X)) - (W - e(X))\tau(X)|^2]\} \qquad (5)$$

in terms of a treatment propensity and a conditional mean outcome. In some aspects, a regularized, empirical version of (5) is minimized (or at least decreased) via a two-step process where: (1) cross-validated estimates $\hat{m}$ and $\hat{e}$ are generated for m and e, respectively, and (2) the empirical loss is evaluated using folds of the data not used for estimating $\hat{m}$ and $\hat{e}$, and minimized. The structure of the loss function can eliminate correlations between m and e, while allowing one to separately specify the form of r through a choice of optimization method. In some embodiments, a causal forest approach (as implemented with generalized random forests) can be employed as an R-learner using the default options, including honest splitting.

As discussed further below, evolution module 124 implements an algorithm (e.g., a genetic or evolutionary algorithm) to evolve (and select a fittest) $\Phi(X)$ transformation (or function), based on a fitness criteria that satisfies the fitness objective (1) and fitness objective (2) discussed above. In general, genetic algorithms are a class of algorithms that include a nature-inspired approach to optimization. Genetic algorithms iteratively generate successive generations of candidate solutions. New generations are formed by selecting members from each generation of candidate solutions, based on a fitness criteria that optimizes one or more fitness objectives, from the previous generation of candidate solutions.

In some aspects of the technology described herein, each candidate solution of a generation of candidate solutions is a ML model that includes a transformation (e.g., $\Phi(X)$) that takes a feature set from a first vector space and generates a transformed feature set, which is a representation of the feature set in a second vector space (e.g., an embedding space of the ML model). Thus, each generation of candidate solutions can be a generation of ML models. In some aspects, each ML model can be generated by training a neural network and implemented on the neural network. The term cohort is also used herein to refer to a generation of ML models. Thus, a cohort can include a generation (or set) of ML models. Because a genetic algorithm iteratively generates successive generations of ML models, the genetic algorithm can be said to generate an (ordered) set of generations of ML models (or an (ordered) set of cohorts). A set of generations of ML models can include one or more lineages of ML models that were evolved from the initial (or seed) generation via the genetic algorithm.

Analogous to reproduction's (somewhat) random mixing, blending, combining, and/or (deterministically and/or stochastically) mutating of genomes from pairs of parents, genetic algorithms perform cross-over and/or mutation operations (on elements of the evolving function) on pairs of parent candidate solutions (e.g., a pair of parent models) from the previous generation to produce new offspring (or child) candidates for the current generation of models. Genetic algorithms encompass extensions and generalizations to algorithms, such as but not limited to memetic algorithms that perform local refinements. Some genetic algorithms act on programs represented as trees. Other genetic algorithms operate on more general representations of functions or other operational units. The unit of selection that the genetic algorithms implemented in the various embodiments operate on is a transformation from one vector space to another vector space (e.g., $\Phi(X)$ which is representable as a 2-tensor operator). As noted throughout, such transformations (e.g., representable as 2-tensors) between vector spaces can be implemented via one or more layers within a NN. Because the unit that the evolution acts upon is one or more layers within a NN, the term neuroevolution refers to the evolution of such transformations.

The form and/or structure of a transformation $\Phi: \mathbb{R}^d \to \mathbb{R}^m$ is now discussed. As noted above, the evolution and selection of the feature mapping is generated by a genetic algorithm (as implemented by evolution module 124). The transformation $\Phi$ transforms a feature set X, which is a first representation of features of a subject in a first d-dimensional vector space, into a transformed feature set $\Phi(X)$, which is a second (or latent) representation of the features (in a second m-dimensional vector space). The transformation $\Phi$ can be implemented via an intermediate layer of a neural network (which itself is trained using gradient-based, backpropagation methods, implemented via NN trainer 122). A set of possible transformations from $\mathbb{R}^d$ $\mathbb{R}^m$ can be employed as a prediction generator from feature set X to outcome Y. Elements of such a generalized set of transformations, which are implementable via a neural network, can be denoted by f. That is, neural network $f_\Theta: \mathbb{R}^d \to \mathbb{R}$ provides a transformation from $\mathbb{R}^d$ to $\mathbb{R}^m$ and can be generalized as:

$$f_\Theta(x) = M_2 \cdot a(M_1 \cdot x + b_1) + b_2 \qquad (6)$$

where $M_1 \in \mathbb{R}^{m \times d}$, $M_2 \in \mathbb{R}^{1 \times m}$ are real-valued matrices (e.g., with elements or components referred to as weights), $b_1 \in \mathbb{R}^m$ and $b_2 \in \mathbb{R}^1$ are column vectors (e.g., with elements or components referred to as biases), and a is a nonlinear activation function applied component-wise. The elements and/or components of the matrices and vectors can be collectively referred to as the parameters of f. $\Theta = (M_1, M_2, b_1, b_2)$ can be used to collectively refer to the parameters for f. Note that $f: \mathbb{R}^d \to \mathbb{R}^m$ can be implemented via a neural network, with a single hidden layer. Also note that f is an operator that maps a real d-dimensional 1-tensor onto a real-valued 0-tensor. Further note that a provides a nonlinear element in f, such that f, as a non-linear operator can be a universal function approximator from the domain $\mathbb{R}^d$ to the codomain $\mathbb{R}^m$. Supervised learning can be employed to determine the values of the parameters of f to approximate any function from the domain $\mathbb{R}^d$ the codomain $\mathbb{R}^m$. In the embodiments, the network (represented by equation (6)) is trained (e.g., as implemented by NN trainer 122) in order to best predict outcome Y from feature set X, via the objective function:

$$\Theta_* = \operatorname*{argmin}_\Theta \mathbb{E}|Y - f_\Theta(X)|^2. \tag{7}$$

That is, equation (7) is a first objective function that NN trainer 122 employs to train ML models implemented by NNs. Given parameters $\Theta$ for the network layers that are symbolically denoted in equation (6), $\Phi_\Theta : \mathbb{R}^d \to \mathbb{R}^m$ denotes the mapping generated (as output) of the hidden layer of the network:

$$\Phi_\Theta(x) = a(M_1 \cdot x + b_1) \tag{8}$$

In some embodiments, candidate feature mappings can be constrained to this form. For parameters $\Theta$ in the parameter-space neighborhood of the optimum of equation (7), the transformed feature set $\Phi_\Theta(X)$ can be approximately as useful as the original feature set X for learning a functional relationship with outcome Y, satisfying fitness objective (1). However, for some values of $\Theta$, the transformed feature set $\Phi_\Theta(X)$ can still carry information useful for predicting treatment W, thus not satisfying fitness objective (2). Accordingly, an additional network $g_{\Psi,\Theta} : \mathbb{R}^d \to [0,1]$ is considered for selecting candidate ML models for satisfying object (2). This additional network $g_{\Psi,\Theta}$ can be symbolically notated as:

$$g_{\Psi,\Theta}(x) = \sigma(M_4 \cdot a(M_3 \cdot \Phi_\Theta(x) + b_3) + b_4) \tag{9}$$

where $M_3 \in \mathbb{R}^{10 \times m}$ and $M_4 \in \mathbb{R}^{1 \times 10}$ are weights, $b_3 \in \mathbb{R}^{10}$ and $b_4 \in \mathbb{R}$ are biases, and $\sigma(x) = (1 + \exp(-x))^{-1}$ denotes the sigmoidal activation function. In this case, $W = (M_3, M_4, b_3, b_4)$ denotes another set of tunable parameters for the network (or function approximator) g. As a universal function approximator, g can be employed to predict (or estimate) treatment W from transformed feature set $\Phi_\Theta(x)$. An objective function for the prediction of treatment W, as a function of the parameter set $\Theta$, can be defined as:

$$\mu(\Theta) = \min_\Psi \mathbb{E}|W - g_{\Psi,\Theta}(X)|^2. \tag{10}$$

Equation (10) can be employed to express a preference for transformed feature sets $\Phi_\Theta(X)$ that are less useful for predicting treatment W.

Figure 2A:
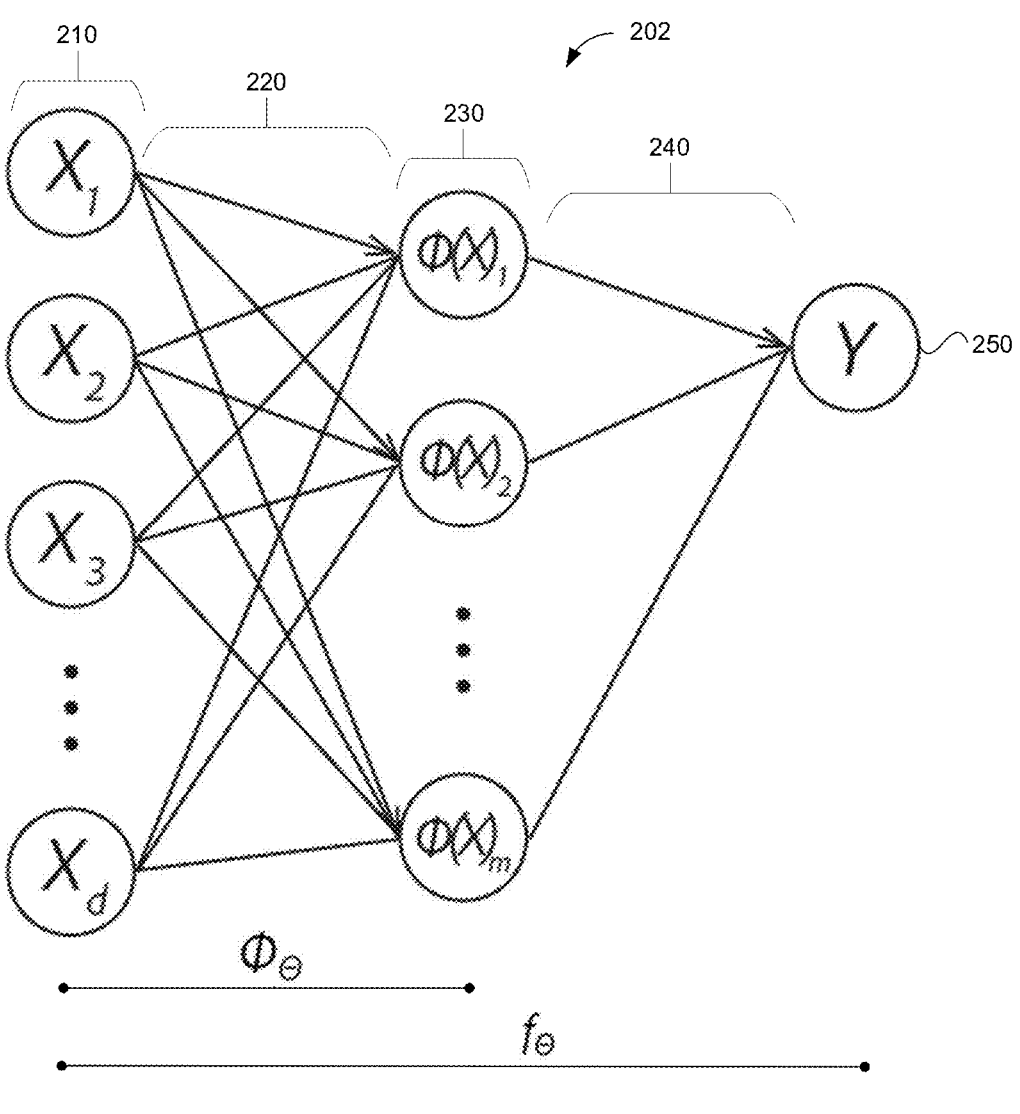
FIG. 2A shows a schematic of a machine learning model trained to predict outcome using observational data, in accordance with various embodiments.

FIG. 2A is a schematic showing an example ML model 202 trained, for instance, via the NN module 122 using the observational data 130 of FIG. 1. In this example, the ML model 202 is a NN trained to predict an outcome Y given a feature set $X_i$. As shown in FIG. 2A, a first transformation 220 (e.g., $\Phi_\Theta$) transforms a first vector 210 (i.e., feature set $X_i$) in a first d-dimensional vector space to a second vector 230 (i.e., transformed feature set $\Phi(X)_j$) in a second m-dimensional vector space. The first transformation 220 corresponds with the transformation $\Phi_\Theta$, as referenced in equation (8). A second transformation 240 maps the second m-dimensional vector space 230 onto a predicted outcome 250 (i.e., outcome Y). The combination of the first transformation 220 and the second transformation 240 corresponds with neural network to $f_\Theta(x)$, as referenced by equation (6).

Aspects of the technology described herein train a cohort of ML models, such as the ML model 202, at each generation. Because each of the ML models is trained to predict outcome Y given a feature set $X_i$, each ML model includes a transformed feature set $\Phi(X)_j$ (e.g., the second vector 230) that is as useful as the original feature set $X_i$ (e.g., the first vector 210) for predicting outcome Y, thereby supporting fitness objective (1). Each of the ML models in a cohort is evaluated to determine which ML models provide a transformed feature set $\Phi(X)_j$ that is less useful at predicting treatment. In this way, ML models with a transformed feature set $\Phi(X)$ that is non-predictive (less predictive) of treatment W can be selected for generating subsequent generations, thereby supporting fitness objective (2). In accordance with some configurations, each ML model is paired with a second ML model for assessing the usefulness of the transformed feature set $\Phi(X)_j$ at predicting treatment.

Figure 2B:
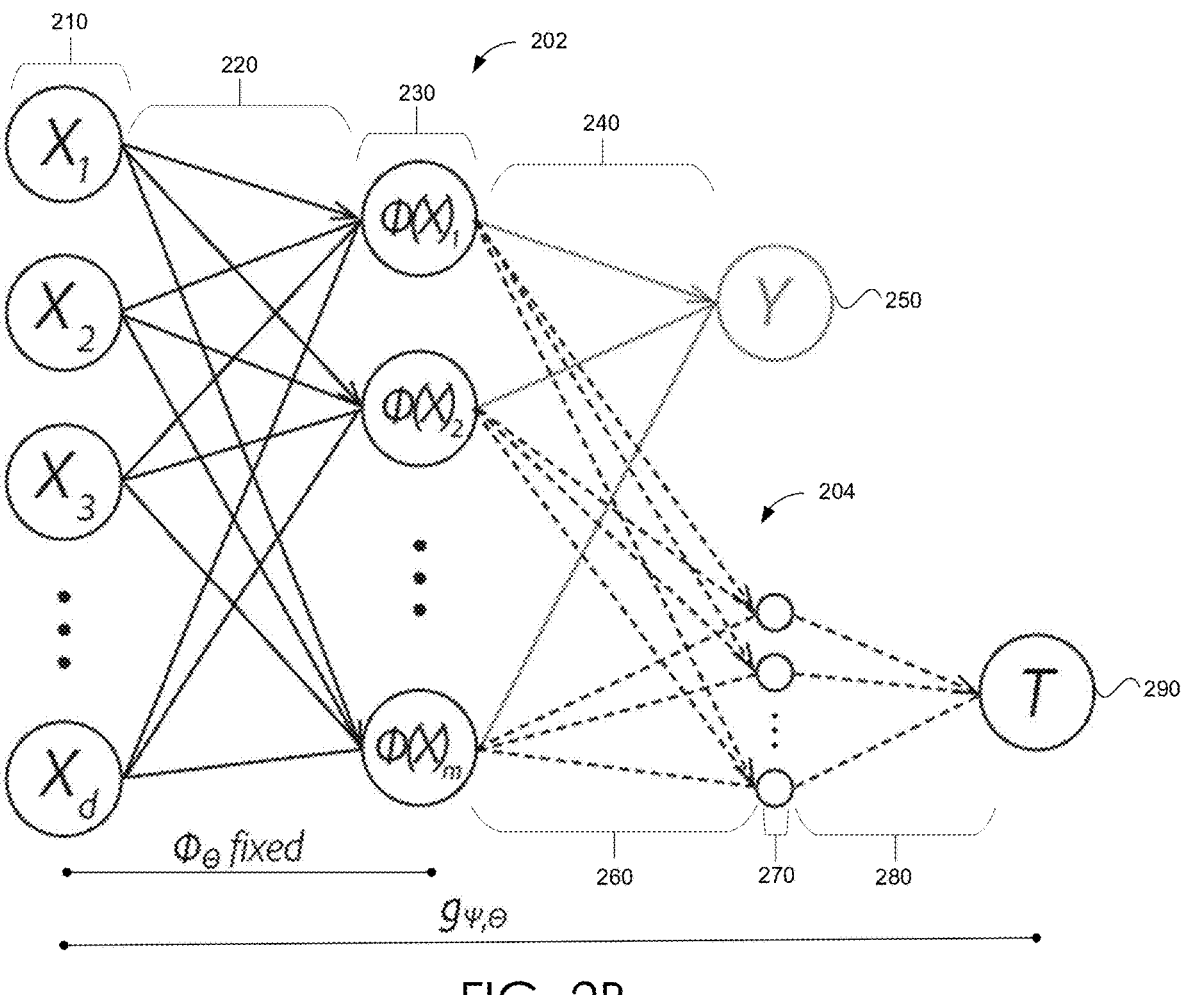
FIG. 2B shows a schematic of the machine learning model of FIG. 2A with a second machine learning model for assessing an ability to predict treatment, in accordance with various embodiments.

FIG. 2B shows a schematic of the ML model 202 for predicting outcome (transformations 220 and 240 shown with solid lines) with a second ML model 204 for predicting treatment (transformations 260 and 280 shown with dashed lines). In this example, the second ML model 204 is a NN trained on top of the NN of the ML model 202 to predict treatment. As shown in FIG. 2B, a third transformation 260 maps the second vector 230 (i.e., transformed feature set $\Phi(X)_j$) in the second m-dimensional vector space to a third vector 270 in a third vector space, which is then mapped via a fourth transformation 280 to a treatment 290. The combination of the first transformation 220 (which is fixed from training the first ML model 202), third transformation 260, and fourth transformation 280 corresponds with neural network $g_{\Psi,\Theta}(x)$, as referenced by equation (9).

Figure 3:
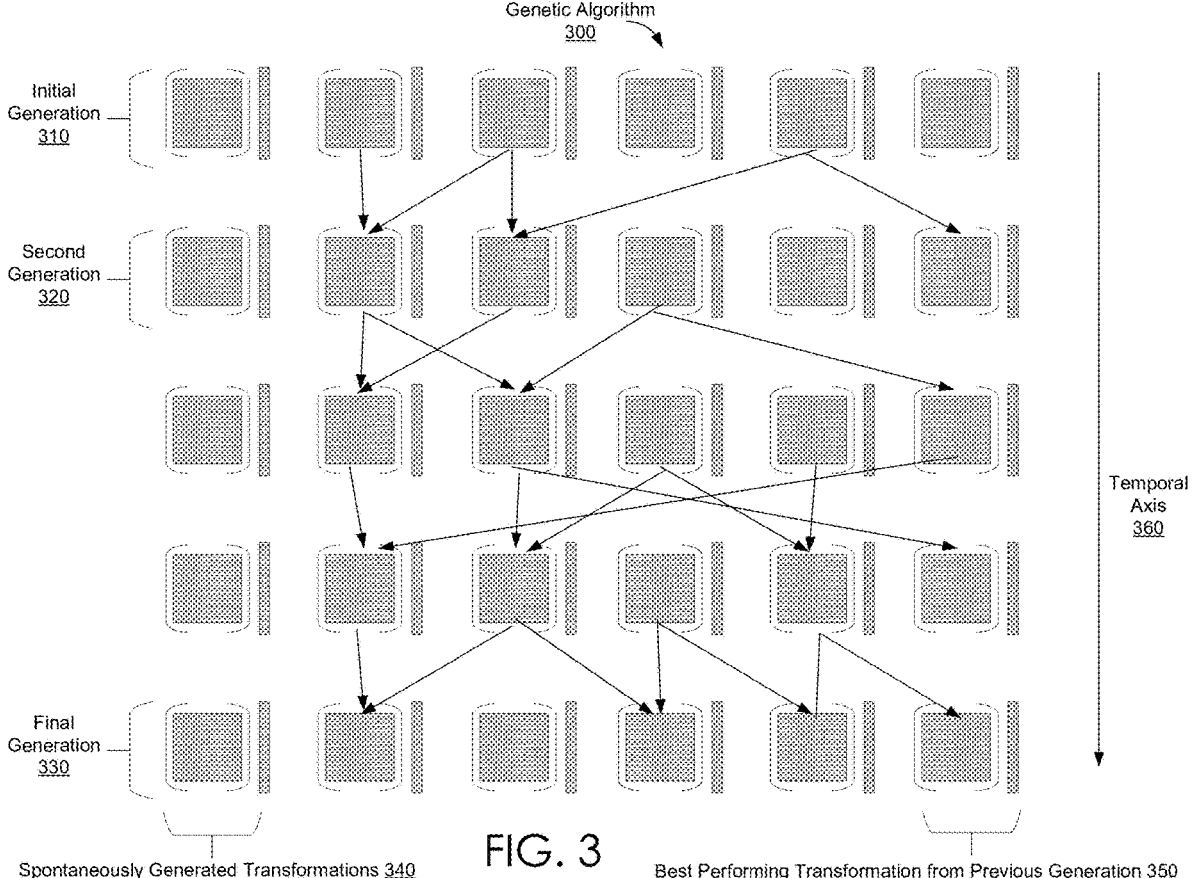
FIG. 3 schematically shows successive generations from genetic blending and selection, as implemented by a genetic algorithm, in accordance with various embodiments.

A generalized process to generate and evolve a population of candidate transformations $\Phi_\Theta$ is now described. Exemplary (and non-limiting) pseudo-code that implements this process is illustrated in pseudo-code 400 of FIG. 4. In addition to FIG. 4, this process is described in conjunction with FIG. 3, which schematically illustrates a genetic algorithm 300 implemented by the various embodiments. More specifically, FIG. 3 schematically shows the genetic blending and selection, as implemented by a genetic algorithm 300, in accordance with various embodiments. Note that the population of candidate instances of the transformation $\Phi_\Theta$ is evolved to generate a parameter set $\Theta_*$, such that the transformed feature set $\Phi_{\Theta_*}(X)$ is nearly as useful for predicting outcome Y as the original feature set X is (e.g., fitness objective (1)) and, among such representations, the transformed feature set $\Phi_{\Theta_*}(X)$ is less useful for predicting treatment W (e.g., fitness objective (2)).

As noted above, FIG. 4 illustrates pseudo-code 400 for a process for evolving a transformation that enables an estimation of a heterogeneous causal effect, in accordance with the various embodiments. A treatment analyzer (e.g., treatment analyzer 120 of FIG. 1) can implement the process being discussed and/or one or more portions of pseudo-code 400. The "data" line of pseudo-code 400 shows the inputs to the process. The inputs include observational data (e.g., observation data 130 of FIG. 1). The observational data is assumed to be independent and identically distributed, with respect to the distribution P. The observational data is further assumed to respect a causal graph (e.g., the causal graph 140 from FIG. 1). In the discussed process, c is a positive integer indicating the number of models included in each generation of a set of generations of models, $\ell$ is a positive integer that indicates the number of parent transformations in each generation of models (e.g., $\ell \le c$), g is a positive integer indicating the number of generations of models, and d is a positive number indicating the dimensionality of a first vector space (e.g., the vector space that embeds subject representations X), and m is a positive integer indicating the dimensionality of a second vector space (e.g., the vector space that embeds the transformed subject representations $\Phi(X)$).

The result line of pseudo-code 400 shows the output of the process. Namely, the output includes the transformation $\Phi$: $\mathbb{R}^d \to \mathbb{R}^m$. The outputted transformation transforms the subject features into a second representation such that causal models (e.g., meta-learners, causal forest, etc.) learned using the transformed training data $\{(\Phi)(X_i), W_i, Y_i)\}_{i \in T}$ perform better than those learned on the original dataset. That is, the transformed data satisfies each of fitness objective (1) and fitness objective (2).

As noted in the data line of pseudo-code 400, given training data $(X_i, W_i, Y_i) \sim^{i.i.d} P$ for $1 \leq i \leq n$ (e.g., observational data 130 of FIG. 1), the observational data is first partitioned into training and validation sets, e.g., $\mathcal{T} = \{(X_i, W_i, Y_i)\}_{i \in T}$ and $V = \{(X_i, W_i, Y_i)\}_{i \in V}$ respectively in the data line of pseudo-code 400. An initial cohort (e.g., an initial generation) of c independent candidates is generated (e.g., models with candidate first transformations $\Phi(X)$, as in equation (8)). Genetic algorithm 300 of FIG. 3 illustrates, (in the uppermost horizontal row of transformations), the initial generation of models 310. Note that each model (e.g., $\Phi(X)$) of the initial generation of models 310, as well as each model in subsequent generations of models is graphically illustrated as a 2-tensor (e.g., matrix $M_1$) paired with a 1-tensor (e.g., column vector $b_1$). For simplicity, the activation function a is not shown in FIG. 3.

Referring again to the pseudo-code 400 of FIG. 4, each model in the initial generation of models (e.g., initial generation of models 310) is generated as indicated in the for loop of lines 1-3 pseudo-code 400. Namely, for $1 \leq j \leq c$, is separate $\Theta_j$ is instantiated using randomized seed values. In at least one embodiment, a Glorot normal initialization process is employed to seed the initial weights and zeros for the biases. A neural network trainer (e.g., NN trainer 122 of FIG. 1) can be employed to seed and train each of the models via the training dataset. A batch-based gradient descent process can be employed on the training set to converge on a solution that tends to seek an optimization to equation (7). In some embodiments, an Adam optimizer, which maintains parameter-specific learning rates, can be employed. Such an optimizer can enable these rates to sometimes increase by adapting them using the first two moments from recent gradient updates. A Tikhonov regularization can be employed for the weights. A dropout layer can be employed after the a(x)=arctan(x) activation function to prevent over-fitting to the training dataset.

As indicated in line 4 of pseudo-code 400, for each member $\Theta_j$ of the initial generation of models, another network (e.g., $g_{\Psi,\Theta}$ as in (9)) is initialized and trained (e.g., via the NN trainer) to seek $\Psi_j = \min_\Psi \mathbb{E} |W - g_{\Psi_j,\Theta_j}(X)|^2$, as indicated in equation (10). The training can be employed to evaluate the objective function $\mathbb{E} |W - g_{\Psi_j,\Theta_j}(X)|^2$. The validation dataset can be employed to estimate $\mu(\Theta_j)$. The $\ell$ fittest members (e.g., models) of the current cohort (e.g., the current generation of models) can be employed to form a new cohort (e.g., a new generation of models) via the genetic algorithm (e.g., genetic algorithm 300 of FIG. 3). That is, the initial generation of models (which includes c) members is culled to include $\ell$ members, where $c \geq \ell$. To perform the culling of the generation, the models in the generation of models can be ranked via the objective function indicated in equation (10), where the top $\ell$ ranking models are chosen to form "mating pairs" for the next generation of models.

After the generation, training, and culling of initial generation of models (e.g., initial generation of models 310 of FIG. 3), an evolution module (e.g., evolution module 124 of FIG. 1) can iteratively perform a genetic algorithm (e.g., genetic algorithm 300 of FIG. 3) on the initial generation of models. The three nested for loops in lines 5-20 denote the iterative genetic algorithm. The outermost for loop (e.g., as defined between lines 5 and 20 in pseudo-code 400) iterate over the g generations. The middle for loop (e.g., as defined between lines 7 and 15 of pseudo-code 400) iterates over the mating pairs of transformations of each generation of the set of generations. The innermost for loop (e.g., as defined between lines 9 and 12 of pseudo-code 400) loops over the rows of the 2-tensors and performs the stochastic mixing, combining, and/or blending of the genetics of each mating pair of transformations.

Returning to the graphical depiction of the genetic algorithm 300, as depicted in FIG. 3, each row denotes a single generation of models. The vertical arrow pointing down indicates a temporal axis 360 of the algorithm 300. The initial generation of models 310 (e.g., the $1^{st}$ generation) is shown at the earliest time (e.g., the top row of models). The final generation of models 330 (e.g., the $g^{th}$ generation) is shown at the latest time (e.g., the bottom row of models). The second generation of models 320 is generated from mating pairs of models from the initial generation of models 310. More specifically, the $\ell$ fittest members of the initial generation 310 are selected. The ranking for the fittest can be based on equation (10). The single fittest member of each generation is chosen to be included in the subsequent generation of models, and shown by the rightmost column of models 350, which is labeled as the "best performing transformation from previous generation." The arrows pointing to the entries in the rightmost column 350 indicate the fittest member of each generation surviving to the next generation. In the various embodiments, the rows between two parents can be stochastically crossed-over (or selected) to generate the offspring generation. This stochastic cross-over is shown in the innermost for loop in lines 9-12 of pseudo-code 400 of FIG. 4. In the non-limiting embodiment of FIG. 4, the stochastic element of the genetic crossover is generated via the Bernoulli distribution. Other embodiments can not be so limited, and other statistical distributions can be employed in other embodiments.

A subsequent generation is initialized to include the best performing candidate (e.g., as denoted by the objective function of equation (10)) from the previous generation, as denoted in line 6 of pseudo-code 400. At the start of the middle for loop of pseudo-code 400 (e.g., line 7 of pseudo-code 400), each of the $\ell$ fittest members of a generation are employed as parents to form $$\binom{\ell}{2}$$

mating pairs. Each of the $$\binom{\ell}{2}$$

mating pair generates a child or offspring transformation for the subsequent generation. In FIG. 3, the arrows from one generation to the next show the mating of transformations to generate an offspring transformation for the subsequent generation. For clarity purposes, not all the mating pairings and arrows are shown in FIG. 3. For embodiments where $$\left(\binom{\ell}{2} - 1\right) < c,$$

one or more spontaneously generated transformations 340 can be included in each generation, as shown in the leftmost column of transformations in FIG. 3. The spontaneous generation of models to "fill-out" a generation is shown in the while loop of pseudo-code 400 (e.g., lines 16-19 of pseudo-code 400).

More specifically, in lines 7-12, a crossover method (e.g., the Montana and David node-based crossover method) can be applied to each of the $$\binom{\ell}{2}$$

pairings. The crossover methods can be applied to determine the parameters $M_1$ and $b_1$ that are used to form $\Phi$ in the child. This amounts to forming a new $\Phi$ by randomly selecting one of the two parents and using that parent's mapping for each coordinate. In lines 9-12 of pseudo-code 400, the new (or child) $M_1$ and $b_1$ are selected in a row-wise manner from the corresponding rows of the parents. In line 13 of pseudo-code 400, the new $M_2$ and $b_2$ are randomly initialized and a few steps of optimization are performed (e.g., by the NN trainer) to form the offspring candidate. In lines 16-19, the next generation is filled-out with spontaneously generated (and trained) transformations (e.g., the while loop in lines 16-19 of pseudo-code 400. The next generation then consists of the best performing $$\binom{\ell}{2}$$

candidate from the previous generation, candidates formed by crossing the best $\ell$ candidates of the previous generation, and $$c - 1 - \binom{\ell}{2}$$

entirely new candidates generated from scratch. In line 21, the fittest evolved transformation (e.g., the one that most satisfies fitness objective (2) is selected as the evolved transformation. At line 22 of pseudo-code 400, the selected transformation is returned.

In the various embodiments, the computations of the valuation function can be performed by training a network of the form of equation (9) to minimize (or at least decrease) $|W - g_{\Psi,\Theta}(X)|^2$ on training batches and then approximating equation (10) by taking the empirical mean on the validation set. A causal model module (e.g., causal model module 126 of FIG. 1) can employ the returned transformation to calculate the CATE of a novel subject, given its feature vector representation.

Based on the choice of the representation $\Phi$ in equation (8), upon training the network using equation (6) to optimize equation (7), the relationship between the learned features $\Phi(X)$ and the outcome Y can be approximately linear. In particular, $Y \approx M_2 \cdot \Phi(X)$ for $M_2$ as given in (6). For this reason, causal meta-learners can be trained using a linear regression base learner. Such trained meta-learners can benefit more extensively from using the transformed features instead of the original features, especially in cases where the relationship between the original features and outcomes is not well-approximated as linear.

Generalized Processes for Determining Heterogeneous Causal Effects

Figure 5:
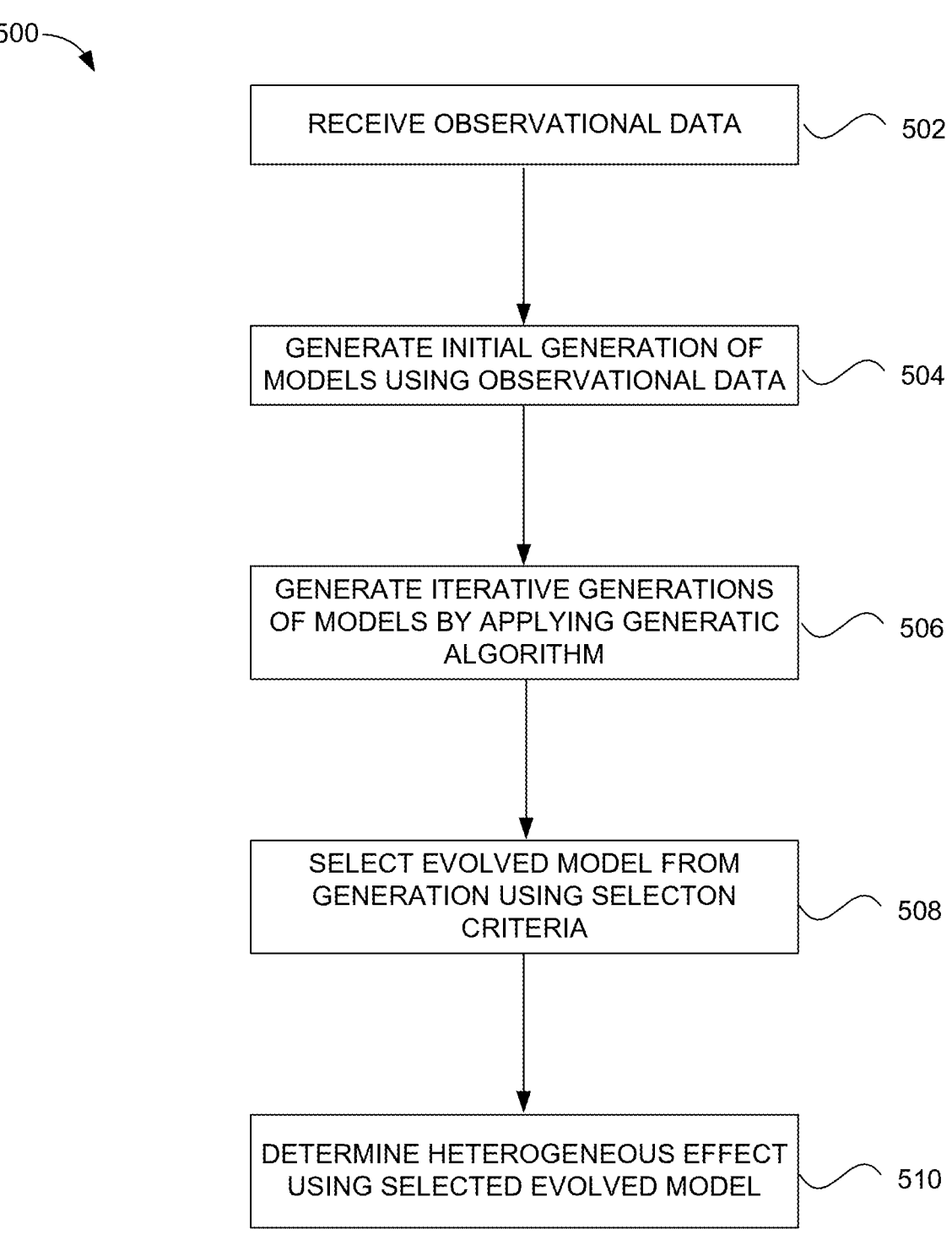
FIG. 5 illustrates one embodiment of a method for determining a heterogeneous causal effect, which is consistent with various embodiments presented herein.
Figure 6:
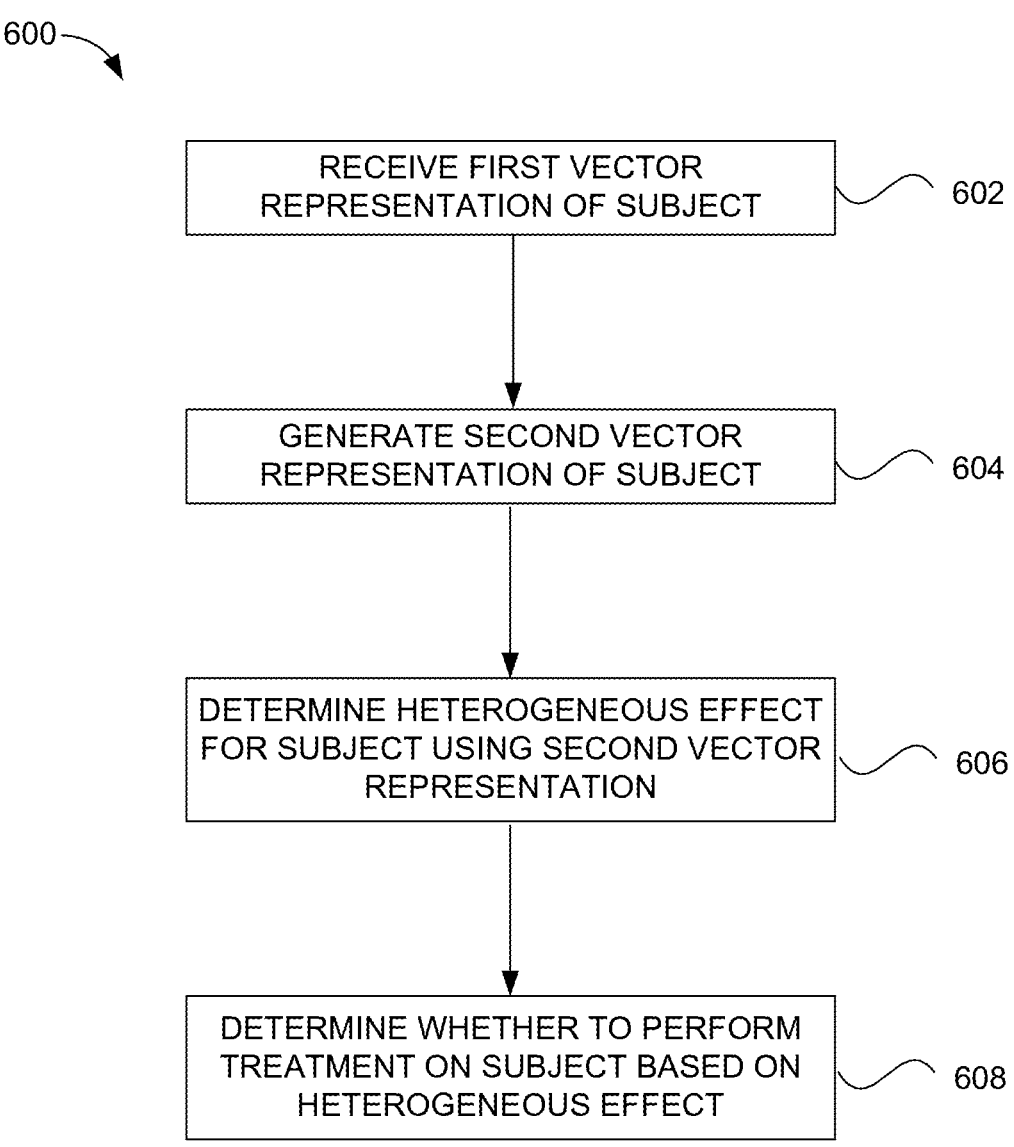
FIG. 6 illustrates another embodiment of a method for determining a heterogeneous causal effect, which is consistent with various embodiments presented herein.
Figure 7:
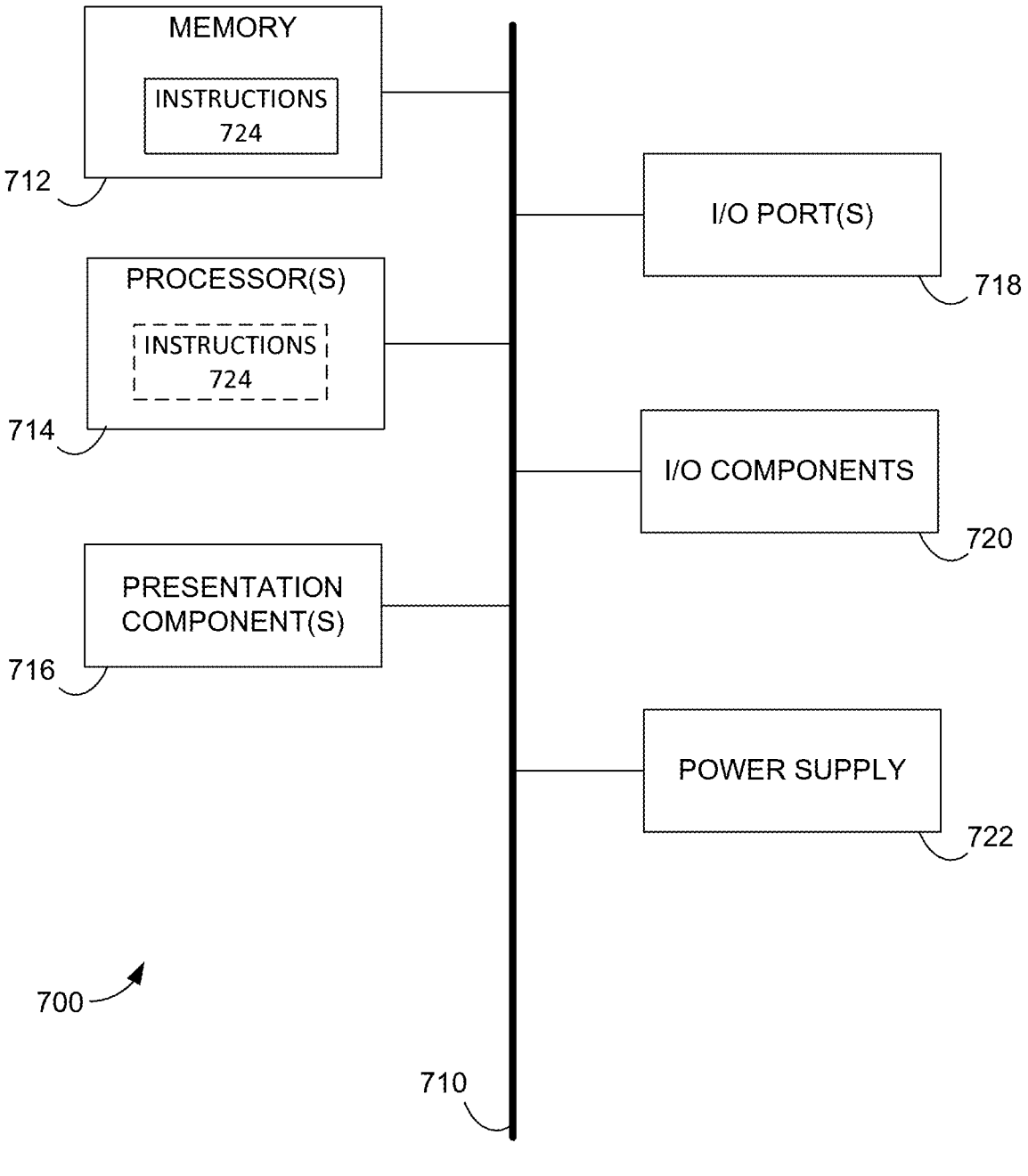
FIG. 7 is a block diagram of an example computing device in which embodiments of the present disclosure can be employed.

Processes 500-600 of FIGS. 5-6, or portions thereof, can be performed and/or executed by any computing device, such as but not limited to, client computing device 102 of FIG. 1, server computing device 104 of FIG. 1, and/or computing device 700 of FIG. 7. Additionally, a treatment analyzer, such as but not limited to treatment analyzer 120 of FIG. 1, can perform and/or execute at least portions of processes 500-600.

FIG. 5 illustrates one embodiment of a method 500 for determining a heterogeneous causal effect, which is consistent with the various embodiments presented herein. Process 500 can be performed by a treatment analyzer, such as but not limited to treatment analyzer 120 of FIG. 1. Furthermore, various blocks of method 500 can be implemented in pseudo-code 400 of FIG. 4, and vice-versa. That is, any of the lines of pseudo-code 400 can implement any, or at least some of the aspects of method 500.

As shown at block 502, observational data (e.g., observational data 130 of FIG. 1) is received. The observational data can include a set of observations associated with a treatment. Each observation of the set of observations can be associated with a subject. Each observation of the set of observations can include a first object encoding a first set of features (e.g., X) for the observation (or the associated subject), a second object encoding a treatment assignment (e.g., W) for the observation (or the associated subject), and a third object encoding an outcome (e.g., Y) for the observation (or the subject). The data line of pseudo-code 400 described segmenting the observational data into a training dataset and a validation training set.

At block 504, an initial generation of models (e.g., initial generation of models 310 of FIG. 3) is generated. The generation of the initial generation of models can be based on a first objective function, e.g., equation (7). In some embodiments, the first objective function can additionally (or alternatively) include equation (10). Each model of the initial generation of models includes a separate first transformation (e.g., $\Phi$) that generates a second set of features (e.g., $\Phi(X)$) for each observation of the set of observations. The first objective function indicates an expected value for the second set of features being predictive of the outcome for the observation (e.g., fitness objective (1)).

In some embodiments, generating the initial generation of models includes, for each model of the initial-generation of models, initializing a set of weights for the first transformation of the model. Initializing the set of weights can be based on stochastic sampling of one or more distributions (e.g., the binomial distribution) of initial weights. For each model of the initial-generation of models, the set of weights for the first transformation can be iteratively updated based on the first objective function.

At block 506, generations of models are generated. The generations of models are generated based on iteratively applying a genetic algorithm (e.g., genetic algorithm 300 of FIG. 3). Each generation of models includes genetic cross-overs, based on a selection criteria (e.g., fitness objective (1) and/or (2)), from another generation of models (e.g., the previous generation) that is an ancestral generation of models to the generation of models.

In various embodiments, each generation of models (e.g., each cohort) includes a set of models. Each model of the set of models (e.g., of a generation or a cohort) includes a separate first transformation that generates a second set of features for each observation of the set of observations and a separate second transformation that generates a third set of features for each observation of the set of observations. Generating the cohort (or generation of models) can include for each model of the generation of models, initializing a set of weights for the second transformation of the model. Initializing the set of weights can be based on stochastic sampling of one or more distributions (e.g., the binomial distribution) of initial weights. For each model of the set of models, the set of weights for the second transformation can be iteratively updated based on decreasing a value of a second objective function that indicates an expected value for the third set of features being predictive of the treatment assignment for the observation.

In some embodiments, each generation includes a fittest-model from an ancestral-generation (e.g., the generation that directly precedes the current generation) of models. Selecting the fittest-model can be based on the selection criteria. As such, a descendant-generation (e.g., the current generation) of models can be generated to include the fittest-model from the ancestral-generation of models.

In some embodiments, for the current generation of models, a descendant-model is generated based on stochastically generating a set of genetic crossovers between the two models of the pair of models. A descendant-generation of models can be generated that includes the descendant-model of each possible pairing of two models from the set of fittest-models. In such embodiments, a pair of two models includes a first model and a second model. The set of genetic crossovers between the first model and the second model can include a stochastic shuffling of elements of a first transformation of the first model and elements of a first transformation of the second model to form a first transformation for a descendant-model of the pair of two models that generates a second set of features for each observation of the set of observations.

In at least one embodiment, for each model of a generation of models (e.g., a cohort), a fitness metric is assigned to the model. The fitness metric can scale with the decreased value of the second objective function for the model. In such embodiments, the selection criteria is employed to select a fittest-model of the set of models. The selection criteria selects, as the fittest-model, the model that has been assigned a largest fitness metric.

At block 508, an evolved model is selected from the generations of models based on the selection criteria. At block 510, a heterogeneous effect (e.g., the CATE) for the treatment is determined based on the set of observations and the evolved model. For example, a causal model (e.g., causal model module 126 of FIG. 1) can calculate the CATE.

FIG. 6 illustrates one embodiment of another method 600 for determining a heterogeneous causal effect, which is consistent with the various embodiments presented herein. Process 600 can be performed by a treatment analyzer, such as but not limited to treatment analyzer 120 of FIG. 1. Furthermore, various blocks of method 600 can be implemented in pseudo-code 400 of FIG. 4, and vice-versa. That is, any of the lines of pseudo-code 400 can implement at least some of the aspects of method 600.

As shown at block 602, a first vector representation of a subject is received (e.g., an original feature set). At block 604, a second vector representation of a subject is generated (e.g., a transformed feature set). The second vector representation can be generated based on a transformation of the first vector representation. For example, the transformation can have been evolved via method 500 of FIG. 5. At block 606, a heterogeneous effect (e.g., the CATE) is determined for the subject using the second vector representation. The determination of the second effect can be further based on a causal model (e.g., an S-learner, a T-learner, an R-learner, or the like). The causal model was trained, in some configurations, by transforming an observational dataset with the transformation that generates the second vector representation of the subject. The subject can be a novel subject, e.g., a subject for which an observation is not included in the observational data employed to train the causal model. At block 608, it is determined whether to perform the treatment on the novel subject based on determined heterogeneous effect. If it is decided to provide the treatment to the subject, the treatment can be administered to the subject.

Additional Embodiments

Aspects of the technology described herein determine the causal effect (e.g., conditional average treatment effect (CATE)) for a novel subject based on observational data that excludes an observation for the novel subject. The observational data includes vector representations (in a first vector space) for experimental subjects, a treatment assignment for each experimental subject, and an outcome for each experimental subject. Population-level differences exist between the control and treatment groups of the experimental subjects. To de-bias correlations between the intra-group experimental subjects, the vector representations are transformed to a second vector space. The employed transformation was evolved via a genetic algorithm. The evolution of the transformation selects for the non-conservation of such intra-group correlations. A meta-learner is trained based on the transformed observational data. The trained meta-learner and the evolved transformation are employed to estimate the CATE for the novel subject. The treatment is or is not provided to the experimental subject based on the CATE More specifically, the technology described herein is directed towards enhanced methods and systems for estimating heterogeneous causal effects. In at least one embodiment, a set of observations associated with a treatment is received. Each observation of the set of observations can include a first object, a second object, and a third object. That is, the observational data can include a set of 3-tuples. Each of the 3-tuples of the set of 3-tuples can encode an experimental observation for a subject of a set of experimental subjects. The first object (e.g., $X \in \mathbb{R}^d$) of a subject's 3-tuple can encode a first set of features for the observation or subject. The second object (e.g., $W=0$ or 1) can encode a treatment assignment for the observation or subject. The third object (e.g., $Y \in \mathbb{R}$) can encode a scalar outcome for the observation or subject. The first object can be a 1-tensor embedded in a first vector space, the second object can be a boolean, and the third object can be a 0-tensor.

An initial-generation of models (e.g., machine learning models) can be generated. The generation of the initial generation of models can be based on a first objective function. Each model of the initial-generation of models can include a separate first transformation (e.g., $\Phi$ that generates a second set of features (e.g., $\Phi(X)$) for each observation of the set of observations. That is, the first transformation can be a 2-tensor that represents a non-linear operator that operates on X. When operated on by $\Phi$, the first object is transformed to another 1-tensor ($\Phi(X) \in \mathbb{R}^m$) that is embedded in a second vector space. In some embodiments, d>m. The first objective function can indicate an expected value for the second set of features being predictive of the outcome for the observation. The first objective function can resemble and/or include equation 7, as discussed above.

A set of generations of models can be generated. Generating the set of generations of models can be based on iteratively applying a genetic algorithm on the initial-generation of models. Each generation of models of the set of generations of models can include genetic crossovers, based on a selection criteria, from another generation of models of the set of generations of models. The other generation of models can be an ancestral generation of models to the generation of models. The selection criteria can be consistent with one or more fitness objectives, such as but not limited to fitness objectives (1) and (2) discussed throughout. After a sufficient evolution of the set of generations, an evolved model from the set of generations of models can be selected based on the selection criteria.

In some embodiments, a heterogeneous effect of the treatment can be determined or estimated. Estimating the heterogeneous effect can be based on the set of observations and the evolved model. The heterogeneous effect can be a conditional average treatment effect (CATE). In some embodiments, the observational data is transformed via the selected evolved model. A meta-learner (e.g., an S-learner, T-learner, R-learner, or the like) can be trained via the transformed observational data. The trained meta-learner can be employed to determine the CATE for a novel subject (e.g., a subject not included in the observational data). A decision whether to provide the treatment to the novel subject can be made based on the estimated CATE for the novel subject. If appropriate (based on the estimated CATE), the treatment can be provided to the novel subject. If not appropriate, the treatment can be withheld from the novel subject.

In various embodiments, generating the initial-generation of models can include, for each model of the initial-generation of models, initializing a set of weights for the first transformation of the model. Initializing the set of weights can be based on stochastic sampling of one or more distributions of initial weights. For each model of the initial-generation of models, the set of weights for the first transformation can be iteratively updated. Iteratively updating the set of weights can be based on the first objective function.

In some embodiments, a current iteration of iteratively applying the genetic algorithm on the initial-generation of models can include selecting a set of fittest-models from an ancestral-generation of models of the set of generations of models. Selecting the set of fittest models can be based on the selection criteria. A descendent-generation of models that includes the fittest-model from the ancestral-generation of models can be generated. The descendent-generation of models can be included in the set of generations of models.

In various embodiments, a current iteration of iteratively applying the genetic algorithm on the initial-generation of cohorts can additionally and/or alternatively include selecting a set of fittest-models from an ancestral-generation of models of the set of generations of models. Selecting the set of fittest-models can be based on the selection criteria. For each possible pairing of two models from the set of fittest-cohorts, a descendent-model can be generated. Generating the descendent-model can be based on stochastically generating a set of genetic crossovers between the two models of the pair of models. A descendent-generation of models can be generated. The descendent-generation of models can include the descendent-model of each possible pairing of two models from the set of fittest-models. The descendent-generation of models can be included in the set of generations of models.

A pair of two models can include a first model and a second model. The set of genetic crossovers between the first model and the second model can include a stochastic shuffling of elements of a first transformation of the first model and elements of a first transformation of the second model to form a first transformation for a descendent-model of the pair of two models. The first generation of the descendent-model can be employed to generate a second set of features for each observation of the set of observations.

In at least one embodiment, each generation of the set of generations of models includes a set of models. Each of the models of the set of models can include a separate first transformation that is employable to generate a second set of features for each observation of the set of observations. Each model can additionally include a separate second transformation that is employable to generate a third set of features for each observation of the set of observations. Generating the set of models can include, for each model of the set of models, initializing a set of weights for the second transformation of the model based on stochastic sampling of one or more distributions of initial weights. For each model of the set of models, the set of weights for the second transformation can be iteratively updated. Iteratively updating the set of weights can be based on decreasing a value of a second objective function. The second objective function can indicate an expected value for the third set of features being predictive of the treatment assignment for the observation.

In some embodiments, generating the set of models can further include, for each model of the set of models, assigning a fitness metric to the model. The fitness metric can scale with the decreased value of the second objective function for the model. The selection criteria can be employed to select a fittest-model of the set of models. The selected fittest-model can have been assigned the largest fitness metric of the set of models.

In another embodiment, data regarding a set of observations can be received. The data for each observation can include a feature set, a treatment, and an outcome. A lineage of models (e.g., a set of generations of models) can be evolved by iteratively "re-shuffling" and combining aspects of models from an initial generation of models. The models of the lineage of models can include machine learning models. The lineage (or set of generations) can include subsequent and/or new generations of models (e.g., generations of models that are descended from the initial generation of models), which can be employed to determine a transformed feature set from the feature set. An algorithm (e.g., a genetic algorithm) can be applied to a subset of a generation's models. The subset of models can be selected from a first (e.g., an initial or an intermediate) generation of models, to generate a new (or subsequent) generation of models. The new generation of models can have been "reproductively" generated similarly to that discussed above to generate a lineage of models. Thus, the generation of the lineage, including the selection of the subset of models, can be based on a fitness criteria for each model. The models can include a learned transformation that is at least partially implemented via an intermediate layer in a neural-network based architecture and/or a 2-tensor. The fitness criteria can be biased in learning a mapping of a first vector space (e.g., a vector space associated with the un-transformed feature sets) to a second vector space (e.g., a latent vector space associated with the transformed feature sets). The fitness criteria can be biased in selecting the transforming intermediate layer (e.g., a particular matrix selected from a search space comprising all such possible transformations), such that the transformed feature sets are at least somewhat predictive of an outcome. One or more models of the lineage of models can be employed to generate training data that includes the transformed feature set for each observation, the treatment for the observation, and the outcome for the observation. The training data can be employed to train another model (e.g., a causal model). The causal model can be a meta-learner model.

In still another embodiment, data regarding a set of observations can be received (e.g., training data at least similar to the training data discussed above). The training data can be employed to train a first (e.g., an initial and/or intermediate) generation of first models (e.g., models of a first model type). The first model type can be implemented by an intermediate layer in a neural network-based architecture or a 2-tensor, where in the intermediate layer includes a transformation for the feature sets. For each model of the first generation of models, a second (machine learning) model can be trained. The second model can be a second model type, where the intermediate layer of the first model is employed as an input layer of the second model. The second model can be trained to predict the outcome for the transformed feature set generated by the intermediate layer of the first model.

A new (e.g., a subsequent and/or final) generation of first models can be generated via an algorithm (e.g., a genetic algorithm). The algorithm can select a subset of the first models from the trained first generation of first models based on a fitness criteria. The fitness criteria can be at least partially aligned with the goal of generating the intermediate layer (of the first models) that is predictive of a treatment, based on transformed feature sets. The algorithm is employed to generate the new generation of first models by having parent pairs of models (included in the selected subset of models) to reproduce and generate child models of the new generation of first models. One or more models of the new generation of models can be employed to generate transformed training data. The transformed training data can include transformed feature sets, as well as corresponding treatments and outcomes. The transformed feature sets being representative of the feature sets in a latent vector space of the first models.

Illustrative Computing Device

Having described embodiments of the present technology, an example operating environment in which embodiments of the present technology can be implemented is described below in order to provide a general context for various aspects of the present technology. Referring to FIG. 7, an illustrative operating environment for implementing embodiments of the present technology is shown and designated generally as computing device 700. Computing device 700 is but one example of a suitable computing environment and is not intended to suggest any limitation as to the scope of use or functionality of the technology described herein. Neither should the computing device 700 be interpreted as having any dependency or requirement relating to any one or combination of components illustrated.

Embodiments of the technology can be described in the general context of computer code or machine-readable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the technology can be practiced in a variety of system configurations, including hand-held devices, consumer electronics, general-purpose computers, more specialized computing devices, etc. Embodiments of the technology can also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output ports 718, input/output components 720, and an illustrative power supply 722. Bus 710 represents what can be one or more buses (such as an address bus, data bus, or combination thereof). Although the various blocks of FIG. 7 are shown with clearly delineated lines for the sake of clarity, in reality, such delineations are not so clear and these lines can overlap. For example, one can consider a presentation component such as a display device to be an I/O component, as well. Also, processors generally have memory in the form of cache. We recognize that such is the nature of the art, and reiterate that the diagram of FIG. 7 is merely illustrative of an example computing device that can be used in connection with one or more embodiments of the present disclosure. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media can comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. Memory 712 can be non-transitory memory. As depicted, memory 712 includes instructions 724. Instructions 724, when executed by processor(s) 714 are configured to cause the computing device to perform any of the operations described herein, in reference to the above discussed figures, or to implement any program modules described herein. The memory can be removable, non-removable, or a combination thereof. Illustrative hardware devices include solid-state memory, hard drives, optical-disc drives, etc. Computing device 700 includes one or more processors that read data from various entities such as memory 712 or I/O components 720. Presentation component(s) 716 present data indications to a user or other device. Illustrative presentation components include a display device, speaker, printing component, vibrating component, etc.

I/O ports 718 allow computing device 700 to be logically coupled to other devices including I/O components 720, some of which can be built in. Illustrative components include a microphone, joystick, gamepad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure is one well adapted to attain all the ends and objects hereinabove set forth together with other advantages which are obvious and which are inherent to the structure.

It will be understood that certain features and sub-combinations are of utility and can be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that can be practiced. It is to be understood that other embodiments can be utilized and structural or logical changes can be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments can be practiced with only some of the described aspects. For purposes of explanation, specific numbers, materials, and configurations are set forth in order to provide a thorough understanding of the illustrative embodiments. However, it will be apparent to one skilled in the art that alternate embodiments can be practiced without the specific details. In other instances, well-known features have been omitted or simplified in order not to obscure the illustrative embodiments.

As used herein, the terms "tensor" and "array" can be used interchangeably to refer to data structures (e.g., a data object) that have one or more components. Such data objects can be, but need not be, multi-dimensional data object. For example, the terms "3-tensor" and "3D array" can be used interchangeably to refer to a 3D data object that requires 3 indices to refer to a specific component of the data object. The terms "2-tensor," "matrix," and "2D array" can be used interchangeably to refer to a 2D data object that requires 2 indices to refer to a specific component of the data object. The terms "1-tensor," "vector," "1D array," and "n-tuple" can be used interchangeably to refer to a 1D data object that requires 1 index to refer to a specific component of the data object. The terms "0-tensor" and "scalar" can refer to a zero-dimensional data object that includes only a single component, and thus no indices are required to refer to the data object's single component. Note that in the various embodiments, the components of a 2D (or higher-dimensional) data object need not, but can, be encoded as 2D (or higher-dimensional) data object. For example, a 2D array can be "flattened" into an encoding that is consistent with a 1D array. Also note that the employment of terms, such as "tensor," "matrix," "vector," and "scalar" to refer to various data objects does not need to, but can, imply that the components of these data objects need to transform by conventional covariant and contravariant transformation laws and/or rules that are employed in the machinery of differential geometry. For example, the "proper length" of a vector (as determined via a suitable metric tensor for a Euclidean or Riemannian manifold) or the value of a scalar need not be frame invariant.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules can be merged, broken into further sub-parts, and/or omitted.

The phrase "in one embodiment" or "in an embodiment" is used repeatedly. The phrase generally does not refer to the same embodiment; however, it can. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A non-transitory computer-readable medium storing executable instructions, which when executed by a processing device, cause the processing device to perform operations comprising:

receiving training data regarding a set of observations, each observation including a feature set, a treatment, and an outcome;

training, using the training data, a first generation of machine learning (ML) models to predict an outcome for a feature set of a given observation;

generating a new generation of ML models by:

selecting a subset of ML models from the first generation of ML models based on a fitness criteria of each ML model to generate an intermediate layer for use in predicting a treatment; and applying an algorithm to the selected subset of ML models to generate the new generation of ML models;

generating, using a ML model of the new generation of ML models, a transformed training data from the training data, the transformed training data comprising, for each observation, a transformed feature set comprising a representation of the feature set in a latent space of the ML model, wherein the transformed feature set causes an accuracy of a causal effect estimation by one or more ML models trained based on the training data to improve by at least reducing a treatment-related bias; and providing a trained ML model of the new generation of ML models capable of estimating a heterogeneous causal effect for a subject not included in the set of observations based on a representation of the subject in the latent space of the ML model.

2. The non-transitory computer-readable medium of claim 1, wherein training the first generation of ML models comprises:

for each ML model of the first generation of ML models, initializing a set of weights for a first transformation of the ML model based on stochastic sampling of one or more distributions of initial weights; and for each ML model of the first generation of ML models, iteratively updating the set of weights for the first transformation based on the fitness criteria.

3. The non-transitory computer-readable medium of claim 1, wherein generating the new generation of ML models comprises:

selecting a fittest-model, based on the fitness criteria, from the first generation of ML models; and generating the new generation of ML models to include the fittest-model from the first generation of ML models.

4. The non-transitory computer-readable medium of claim 1, wherein generating the new generation of ML models comprises:

for each possible pairing of two ML models from the selected subset of ML models, generating a descendent-model based on stochastically generating a set of genetic crossovers between the two ML models of the pair of ML models; and generating the new generation of ML models to include the descendent-model of each possible pairing of two ML models from the selected subset of ML models.

5. The non-transitory computer-readable medium of claim 4, wherein a pair of two ML models includes a first ML model and a second ML model, and the set of genetic crossovers between the first ML model and the second ML model includes a stochastic shuffling of elements of a first transformation of the first ML model and elements of a first transformation of the second ML model to form a first transformation for a descendent-model of the pair of two ML models that generates the transformed feature set for each observation of the transformed training data.

6. The non-transitory computer-readable medium of claim 1, wherein each ML model of the new generation of ML models includes a separate first transformation that generates the transformed feature set for each observation of the transformed training data and a separate second transformation that generates a third feature set for each observation of the transformed training data, and generating the new generation of ML models comprises:

for each ML model of the new generation of ML models, initializing a set of weights for the second transformation of the ML model based on stochastic sampling of one or more distributions of initial weights; and for each ML model of the new generation of ML models, iteratively updating the set of weights for the second transformation based on decreasing a value of an objective function that indicates an expected value for the third feature set being predictive of a treatment assignment for the observation.

7. The non-transitory computer-readable medium of claim 6, wherein generating the new generation of ML models further comprises:

for each ML model of the new generation of ML models, assigning a fitness metric to the ML model that is based on the fitness criteria, wherein the fitness metric scales with the decreased value of the objective function for the ML model; and employing the fitness criteria to select a fittest-model of the new generation of ML models, wherein the selected fittest-model has been assigned a largest fitness metric of the new generation of ML models.

8. The non-transitory computer-readable medium of claim 1, wherein the operations further comprise:

determining a heterogeneous effect of the treatment based on the transformed training data and a causal ML model.

9. The non-transitory computer-readable medium of claim 8, wherein the causal ML model is a meta-learning model, the heterogeneous effect is a conditional average treatment effect, and the operations further comprise:

employing the transformed training data to train the meta-learning model.

10. The non-transitory computer-readable medium of claim 1, wherein the algorithm is a genetic algorithm.

11. A method comprising:

receiving data regarding a set of observations, the data for each observation including a feature set, a treatment, and an outcome;

determining, using a machine learning (ML) model of a new generation of ML models, a transformed feature set from the feature set for each observation, the new generation of ML models generated by applying an algorithm to a subset of ML models selected from a first generation of ML models based on a fitness criteria of each ML model to generate an intermediate layer for use in predicting a treatment, the transformed feature set comprising, for each observation, a representation of the feature set in a latent space of the ML model;

generating training data comprising, for each observation, the transformed feature set for the observation, the treatment for the observation from the data, and the outcome for the observation from the data; and training a causal model based on the training data, wherein the causal model is trained to generate a causal effect estimation associated with a subject not included in the set of observations by reducing a treatment-related bias based on the training data and a representation of the subject in a vector space associated with the transformed feature set.

12. The method of claim 11, wherein the algorithm is a genetic algorithm and the causal model is implemented by a meta-learner.

13. The method of claim 11, wherein training the causal model includes training the causal model to determine a heterogeneous effect of the treatment based on the transformed training data.

14. The method of claim 11, wherein each ML model of the new generation of ML models is implemented by a neural network-based architecture and the intermediate layer is an intermediate layer in the neural network-based architecture.

15. The method of claim 11, further comprising:

employing other training data to train the first generation of ML models to predict an outcome for a feature set of a given observation.

16. The method of claim 15, wherein training the first generation of ML models comprises:

for each ML model of the first generation of ML models, initializing a set of weights for a first transformation of the ML model based on stochastic sampling of one or more distributions of initial weights; and for each ML model of the first generation of ML models, iteratively updating the set of weights for the first transformation based on the fitness criteria.

17. The method of claim 15, wherein generating the new generation of ML models comprises:

selecting a fittest-model, based on the fitness criteria, from the first generation of ML models; and generating the new generation of ML models to include the fittest-model from the first generation of ML models.

18. A system comprising:

a memory component; and a processing device coupled to the memory component, the processing device to perform operations comprising:

receiving training data regarding a set of observations, each observation including a feature set, a treatment, and an outcome;

training, using the training data, a first generation of first machine learning (ML) models to predict an outcome for a feature set of a given observation;

for each first ML model from the first generation of first ML models, training a second ML model to predict a treatment using an intermediate layer of the first ML model as an input layer to the second ML model;

generating a new generation of first ML models by:

selecting a subset of first ML models from the trained first generation of first ML models based on a fitness criteria of each first ML model to generate an intermediate layer for use by a corresponding second ML model in predicting a treatment; and using an algorithm to generate the new generation of first ML models using the selected subset of first ML models;

generating, using a first ML model of the new generation of ML models, a transformed training data from the training data, the transformed training data comprising, for each observation, a transformed feature set comprising a representation of the feature set in a latent space of the first ML model and the transformed training data is generated based on a neural network layer trained using the algorithm, wherein the algorithm is a genetic algorithm that evolves model parameters over successive generations; and providing a trained ML model of the new generation of ML models capable of estimating a causal effect for a subject not included in the set of observations based on the representation of the subject in the latent space of the ML model.

19. The system of claim 18, wherein generating the new generation of ML models comprises:

for each possible pairing of two ML models from the selected subset of ML models, generating a descendent-model based on stochastically generating a set of genetic crossovers between the two ML models of the pair of ML models; and generating the new generation of ML models to include the descendent-model of each possible pairing of two ML models from the selected subset of ML models.

20. The system of claim 19, wherein a pair of two ML models includes a first ML model and a second ML model, and the set of genetic crossovers between the first ML model and the second ML model includes a stochastic shuffling of elements of a first transformation of the first ML model and elements of a first transformation of the ML second model to form a first transformation for a descendent-model of the pair of two ML models that generates the transformed feature set for each observation of the transformed training data.

* * * * *